US009232279B2

(12) United States Patent
Beeson et al.

(10) Patent No.: US 9,232,279 B2
(45) Date of Patent: Jan. 5, 2016

(54) METHOD AND SYSTEM FOR USING A SECOND SCREEN DEVICE TO TUNE A SET TOP BOX TO DISPLAY CONTENT PLAYING ON THE SECOND SCREEN DEVICE

(71) Applicant: The DIRECTV Group, Inc., El Segundo, CA (US)

(72) Inventors: Charles W. Beeson, La Mirada, CA (US); Earl J. Bonovich, Tinley Park, IL (US); Shannon A. Kallin, Santa Monica, CA (US); Erin K. Nelson, Torrance, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 14/137,886

(22) Filed: Dec. 20, 2013

(65) Prior Publication Data

US 2014/0109131 A1 Apr. 17, 2014

Related U.S. Application Data

(63) Continuation of application No. 13/280,171, filed on Oct. 24, 2011.

(51) Int. Cl.

| | |
|---|---|
| ***H04N 21/41*** | (2011.01) |
| ***H04N 21/482*** | (2011.01) |
| ***H04N 21/422*** | (2011.01) |
| ***H04N 21/4363*** | (2011.01) |
| ***H04N 21/454*** | (2011.01) |

(52) U.S. Cl.

CPC ......... *H04N 21/482* (2013.01); *H04N 21/4122* (2013.01); *H04N 21/4126* (2013.01); *H04N 21/42209* (2013.01); *H04N 21/43637* (2013.01); *H04N 21/454* (2013.01)

(58) Field of Classification Search

CPC .......... H04N 21/4122; H04N 21/4126; H04N 21/422

USPC ................................................ 725/28, 38, 59

See application file for complete search history.

(56) References Cited

U.S. PATENT DOCUMENTS

| | | | | |
|---|---|---|---|---|
| 8,547,414 | B2 * | 10/2013 | Sheeley | 348/14.03 |
| 2007/0106945 | A1 * | 5/2007 | Kim | 715/740 |
| 2009/0153288 | A1 * | 6/2009 | Hope et al. | 340/3.1 |
| 2010/0333135 | A1 * | 12/2010 | Lau et al. | 725/39 |
| 2011/0283311 | A1 * | 11/2011 | Luong | 725/28 |
| 2011/0320626 | A1 | 12/2011 | Wong et al. | |
| 2012/0060179 | A1 * | 3/2012 | Lyu | 725/27 |
| 2012/0062471 | A1 * | 3/2012 | Poulidis et al. | 345/173 |
| 2013/0054742 | A1 | 2/2013 | Tsuji et al. | |

FOREIGN PATENT DOCUMENTS

| | | | |
|---|---|---|---|
| EP | 1796389 | A2 | 6/2007 |
| EP | 2677757 | A2 | 12/2013 |
| WO | 2011/091296 | A1 | 7/2011 |

* cited by examiner

*Primary Examiner* — Mark D Featherstone
*Assistant Examiner* — Tien M Nguyen

(57) ABSTRACT

A system and method for displaying operating a receiving device includes a second screen device in communication with the receiving device. The second screen device displays streamed content having an identifier associated therewith having a touch screen, forms a tune command comprising the identifier and a receiving device identifier in response to a gesture on the touch screen and communicates the tune command to the receiving device from the second screen device. The receiving device is tuned to receive a channel corresponding to the streamed content in response to the tune command. The receiving device displays the channel.

13 Claims, 24 Drawing Sheets

METHOD AND SYSTEM FOR USING A SECOND SCREEN DEVICE TO TUNE A SET TOP BOX TO DISPLAY CONTENT PLAYING ON THE SECOND SCREEN DEVICE

CROSS-REFERENCE TO RELATED APPLICATIONS

This application is a continuation application of U.S. application Ser. No. 13/280,171, filed Oct. 24, 2011, which application is incorporated by reference herein.

TECHNICAL FIELD

The present disclosure relates generally a television programming delivery system, and, more specifically, to using a second screen device to enhance a user experience by tuning a set top box to content being streamed to the second screen device.

BACKGROUND

The statements in this section merely provide background information related to the present disclosure and may not constitute prior art.

Television content providers are continually increasing the amount of television content provided. In addition to the actual television programming content, television providers also provide limited information regarding the content such as a brief description, running time, parental ratings, and the like. The limited data may be metadata delivered with the content or guide data and may be delivered directly to the set top box. Content users increasingly desire further information relative to the content.

Mobile devices such as touch-screen mobile devices have also increased in popularity. Such devices are typically connectable to the internet to obtain content from various sources. Mobile touch-screen devices include the iPad® by Apple and various Android® operating system devices. The mobile devices are capable of receiving Internet Protocol content including streamed videos.

SUMMARY

The present disclosure provides a system and method for using a second screen device for controlling the tuning of a set top box to a content being displayed on the second screen device.

In one aspect of the disclosure, a method includes displaying streamed content having an identifier associated therewith on a second screen device having a touch screen, generating a gesture on the touch screen, forming a tune command comprising the identifier and a receiving device identifier in response to the gesture in the second screen device, communicating the tune command to the receiving device from the second screen device, tuning the receiving device to receive a channel signal corresponding to the streamed content in response to the tune command and displaying the channel signal at a display associated with the receiving device.

In a further aspect of the disclosure, a system for displaying operating a receiving device includes a second screen device in communication with the receiving device. The second screen device displays streamed content having an identifier associated therewith having a touch screen, forms a tune command comprising the identifier and a receiving device identifier in response to a gesture on the touch screen and communicates the tune command to the receiving device from the second screen device. The receiving device is tuned to receive a channel corresponding to the streamed content in response to the tune command. The receiving device displays the channel.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
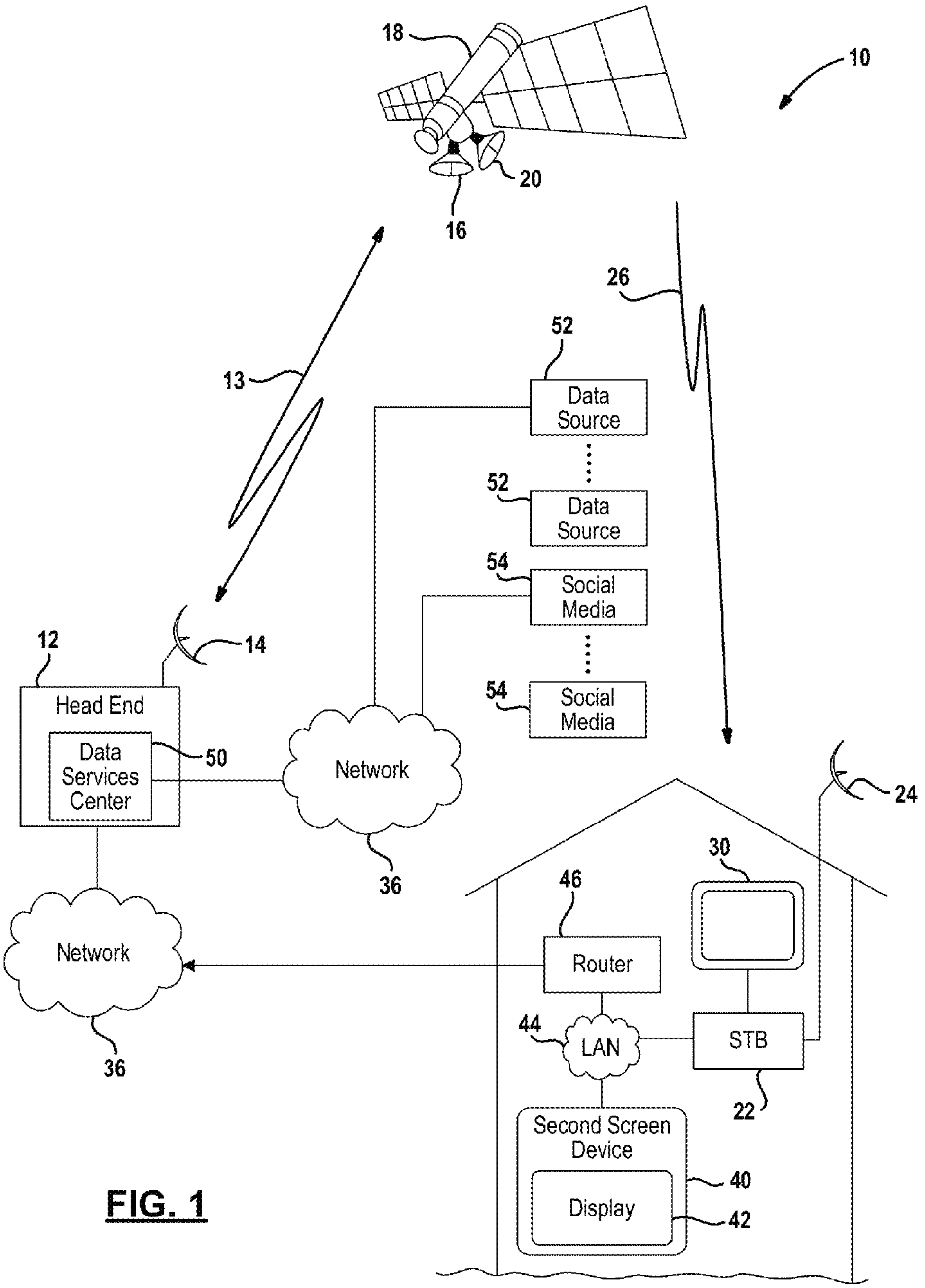
FIG. 1 is a block diagrammatic view of a communication system for content playback and delivery according to the present disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Further, while the following disclosure is made with respect to the delivery of content (e.g., television (TV), movies, games, music videos, etc.), it should be understood that the systems and methods disclosed herein could also be used for delivery of any media content type, for example, audio, music, data files, web pages, games, etc. Additionally, throughout this disclosure reference is made to programs, data, information, movies, assets, video data, etc., however, it will be readily apparent to persons of ordinary skill in the art that these terms are substantially equivalent in reference to the example systems and/or methods disclosed herein. As used herein, the term content, title or program will be used to refer to a movie or television program name.

Referring now to FIG. 1, a satellite television broadcasting system 10 is illustrated. The satellite television broadcast system 10 includes a head end 12 that generates wireless signals 13 through an antenna 14 which are received by an antenna 16 of a satellite 18. The wireless signals 13, for example, may be digital. The wireless signals 13 may be referred to as an uplink signal. A transmitting antenna 20 generates downlink signals that are directed to various receiving systems including stationary systems such as those in the home, as well as, mobile receiving systems. A set top box 22 is an example of a stationary receiving device or system that may be placed at different locations relative to the display or television. The set top box 22 is in communication with an antenna 24. The antenna 24 receives downlink signals 26 from the transmitting antenna 20 of the satellite 18.

The head end 12 may communicate various content, program guide data or other data through the satellite 18. For example, television channels from a broadcast network or channels generated locally at the head end 12 may be communicated through the satellite. The set top box 22 may receive the content and data. A plurality of set top boxes 22 may be provided in a system. The plurality of set top boxes 22 may be located within a single building or household.

The set top box or boxes 22 each have a display 30 associated therewith. The display 30 may be a television or monitor used for displaying video images and providing an audio output.

A network 36 may be used to connect the head end 12 with various devices including the set top box 22. The network 36 may be one type of network or multiple types of networks. The network 36 may, for example, be a public switch to telephone network, the internet, a mobile telephone network or other type of network. The head end 12 may simultaneously communicate streaming channel signals corresponding to all or a limited set of the channels from the head end 12. The streaming channels are communicated through the head end 12.

The system 10 may also include a second screen device 40. The second screen device 40 may be various types of devices including a mobile phone, a laptop, or a touch screen device, tablet device or computer. The second screen device 40 may have a screen display 42 used for displaying various types of information as will be set forth further below. The second screen device 40 is referred to as such because it is used together with the display 30 associated with the set top box 22. The second screen device 40 may be referred to as a mobile device.

A local area network (LAN) 44 may also be incorporated into the system. The local area network 44 may be in communication with the set top box 22 and the second screen device 40. The local area network 44 may be a wireless local area network.

The local area network 44 may also include a router 46. The router 46 may allow the devices within the local area network 44 to inter-communicate. In this example, the local area network 44 may allow the second screen device 40 and the set top box 22 to communicate. The router 46 may also communicate with the network 36.

The local area network 44 may be used to communicate the streaming channels to the second screen device 40. The router 46 may be in communication with the head end 12 through the network 12.

A data services center module 50 (data services center) may be in communication with the head end 12. The data services center 50 may also be included in the head end 12 as is illustrated. The data services center 50 is in communication with the network 36 to gather various data. As mentioned above, the network 36 may be the internet. The data services center 50 may gather data from various data sources 52 and act as a data server for distributing the data. The data sources 52 may include data sources 52 for different types of data related to the content provided. Examples of data will be provided below. In general, the data may include actor information, pictures, posters, ratings data, sports scores, and the like.

Another source of data in communication with the data services center 50 is a social media source 54. Various types of social media sources may be used including websites. Blogs, Twitter®, and Facebook® are examples of social media sources or websites. The data services center 50, as will be described below, may aggregate data from the various sources. The data may be aggregated and indexed in a database with the head end 12 or data services center 50 to correspond to a content identifier as will be described below.

Figure 2:
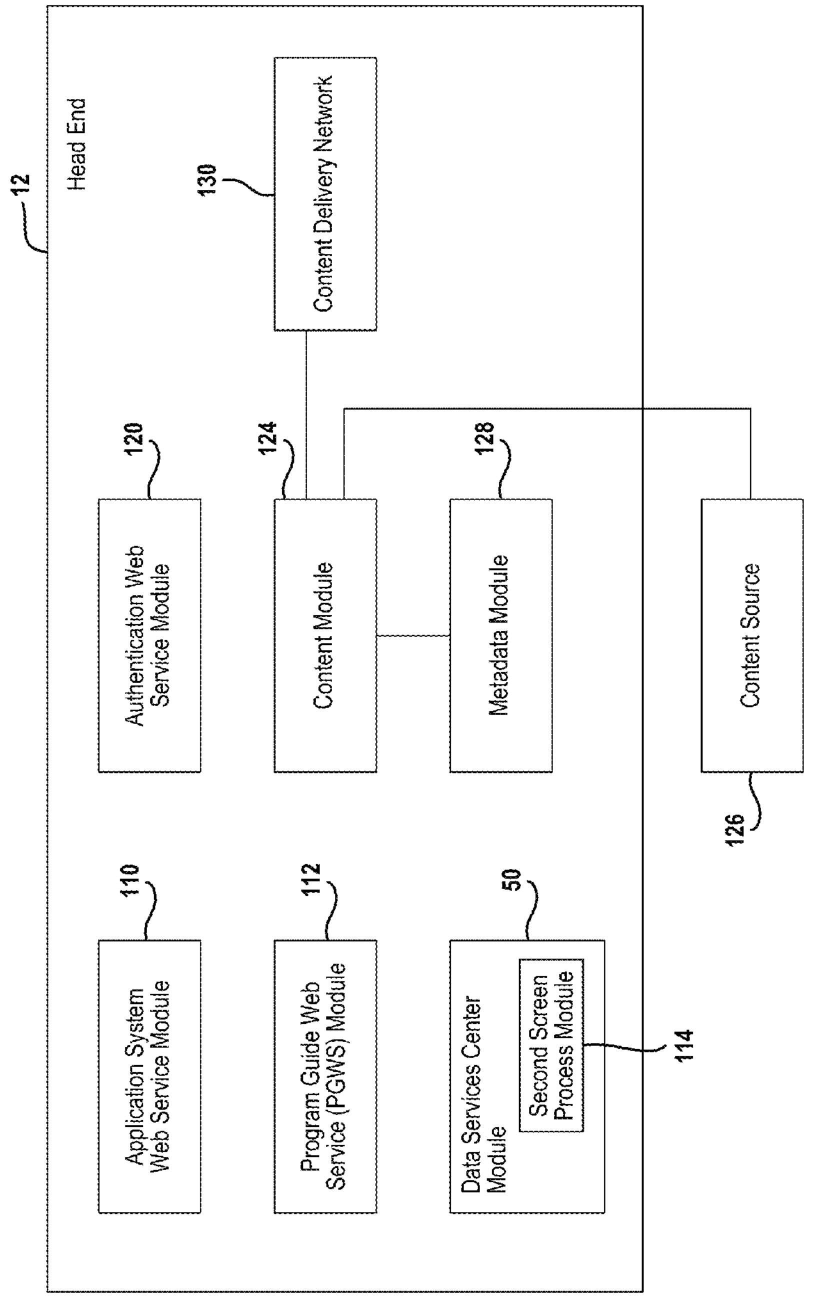
FIG. 2 is a high-level block diagrammatic view of the head end of FIG. 1.

Referring now to FIG. 2, the head end 12 is illustrated in further detail. The head end 12 may include various modules that are interconnected. The interconnections have been eliminated in the figure for simplicity. The head end 12 is illustrated as being within one facility. However, various numbers of facilities with different numbers of modules may be used in an actual implementation.

The head end 12 may include an application system web service module 110. The application system web service module 110 may be a configuration service that provides site definitions, host uniform research locators and application settings. The application system web service module 110 may be used to call other web services such as the program guide web service 112. Interaction of the application system web service 110 will be further described below.

The program guide web service module 112 provides a listing of content to various devices including the set top box 22. The program guide web service module 112 may provide details for a grid guide or specific data for a specific channel. The program guide web service module 112 may deliver the program data, channel data, ratings data or other forms of data to the second screen device through the network 36 illustrated in FIG. 1.

The data services center 50 is also illustrated as being incorporated within the head end 12. The data services center 50 may include a second screen process module 114 for providing second screen data to second screen devices with the system. As mentioned above, the data services center 50 may be used to aggregate various data from various sources that it may be provided to the second screen device upon request.

The head end 12 may also include an authentication web service module 120. The authentication web service 120 may act as a look-up service to authenticate a user device such as the set top box or the second screen device. The authentication web service module 120 may also be used as a setup service that is used to setup the second screen device based on various user parameters. Such user parameters may include the type of device and the services subscribed to. Some services may be selectively provided to user devices for a fee.

The head end 12 may also include a content module 124. The content module 124 may store content therein. The content module 124 may store movies or sports or other on-demand types of content. Some content may be communicated on a pay-per-view basis. Pay-per-view is communicated on a linear channel at a predetermined time. The content module 124 may also be used to communicate live content to users from a content source 126. The content source 126 may provide live or linear content. Linear content is content that is broadcasted at a pre-scheduled time according to a pre-determined schedule. Non-linear content, such as on-demand content, is different than pay-per-view and is broadcasted upon request and not according to a preset schedule.

A metadata module 128 may also provide data that is broadcasted with the content. The metadata module 128 may also provide data to the program guide web service 112. The metadata module 128 may also include closed-captioning, ratings data, or other data that is broadcasted with the content or program guide.

A content delivery network 130 is used to broadcast content to the set top boxes. The content delivery network 130 may broadcast formatted signals such as packetized signals. The formatted signals may be broadcasted through the satellite 18 or may be communicated through the network 36 illustrated in FIG. 1.

Figure 3:
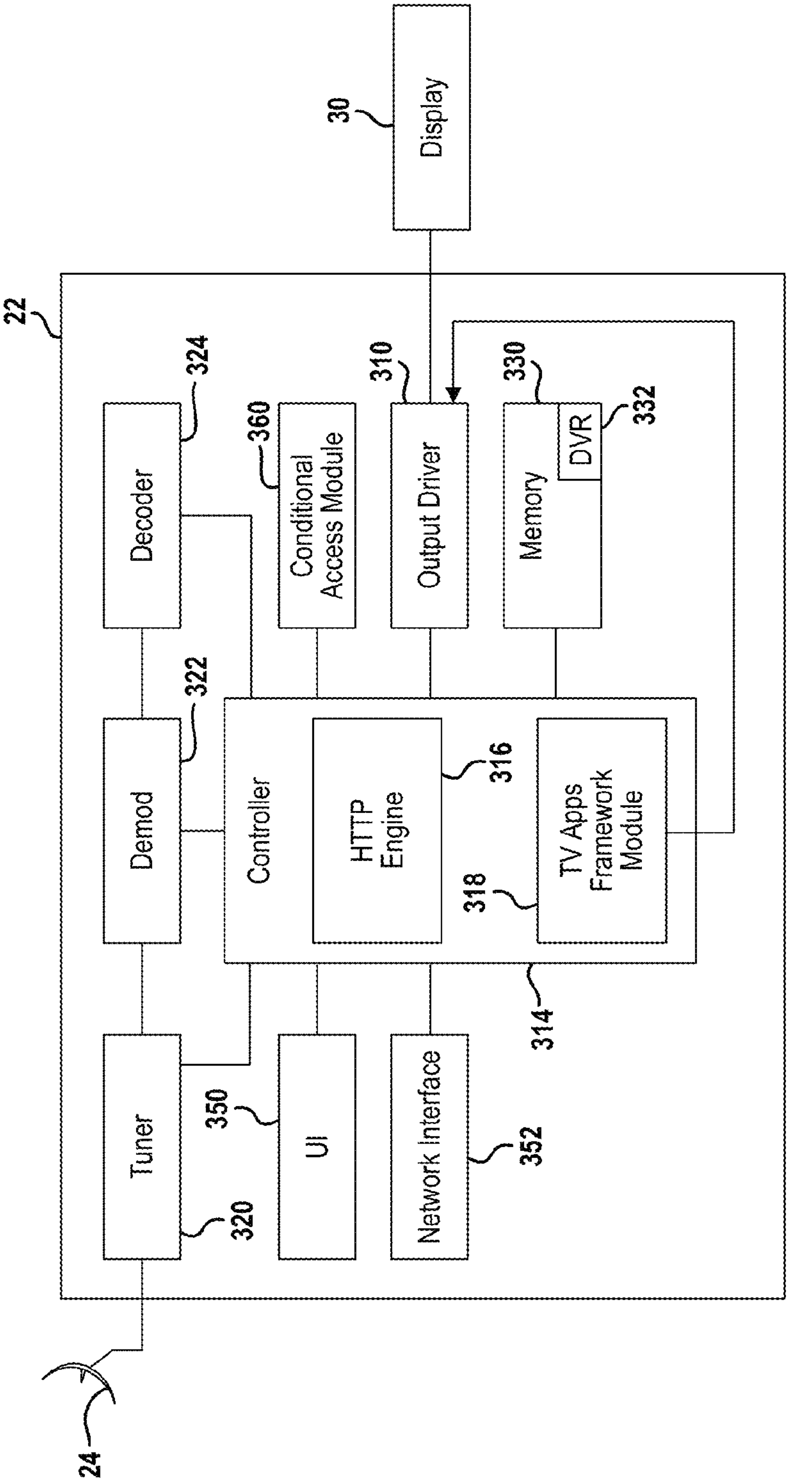
FIG. 3 is a high-level block diagrammatic view of the set top box of FIG. 1.

Referring now to FIG. 3, the set top box 22 is illustrated in further detail. Although, a particular configuration of the set top box 22 is illustrated, it is merely representative of various electronic devices with an internal controller used as a content receiving device. The antenna 24 may be one of a number of different types of antennas that may include one or more low noise blocks associated therewith. The antenna 24 may be a single antenna used for satellite television reception. Of course, multiple antennas for different orbital slots may be used. In a cable system no antenna may be used. Rather, a connector to a cable may be used. The set top box 22, as described above, is coupled to a display 30. The display 30 may have an output driver 310 within the set top box 22.

A controller 314 may be a general processor such as a microprocessor that cooperates with control software. The controller 314 may be used to coordinate and control the various functions of the set top box 22. These functions may include a tuner 320, a demodulator 322, a decoder 324 such as a forward error correction decoder and any buffer or other functions.

The tuner 320 receives the signal or data from the individual channel. The tuner 320 may receive data from a satellite or a terrestrial source such as a cable. The tuner 320 may receive television programming content, program guide data or other types of data. The tuner 320 may be tuned to a particular channel under the control of the controller 314 for recording or displaying a particular channel or content.

The demodulator 322 demodulates the signal or data to form a demodulated signal or data. The decoder 324 decodes the demodulated signal to form decoded data or a decoded signal. The controller 314 may be similar to that found in current DIRECTV® set top boxes which uses a chip-based multifunctional controller. Although only one tuner 320, one demodulator 322 and one decoder 324 are illustrated, multiple tuners, demodulators and decoders multiple tunes, demodulators and decoders may be provided within a single set top box 22.

The controller 314 may also include a hypertext transfer protocol (HTTP) engine module 316 and a television application framework module 318. The HTTP engine module 316 (HTTP engine) is used to receive commands through the local area network 44. The commands in this example are received from the second screen device 40. The HTTP engine module 316 receives the commands that are acted upon by the controller 314. When the HTTP signals are received at the HTTP engine 316 are remote control commands, the HTTP engine exposes the underlying commands from the signal which are acted upon by the controller 314. The remote control commands may be the same commands that are used by a remote control device that are used to control the set top box 22. Other commands may be received at the HTTP engine 316 such as a tune command to tune a tune the tuner 320 to a particular channel for viewing or recording or storing within the set top box 320.

The television (TV) application framework module 318 is used for launching various applications such as a widget that is viewable on the television. The widgets may be displayed on top of the video on the display 30. In this particular example, the television application framework module 318 may be used to communicate with the data services center 50 illustrated in FIG. 1. The TV application framework module 318 may request data for user accounts, program information, sports data, or the like from the data services center 50. The TV application framework module 318 may receive the requested data and display the data in a particular format or position on the display 20.

The controller 314 is in communication with a memory 330. The memory 330 is illustrated as a single box. The memory 330 may actually be a plurality of different types of memory including the hard drive, a flash drive and various other types of memory. The memory 330 may be other types of memory or sections of different types of memory. The memory 330 may be non-volatile memory or volatile memory.

The memory 330 may include storage for various operational data collected during operation of the set top box 22. For example, the memory 330 may store various types of data including set top box playlist data that has the playlist for content saved within the memory 330. Another type of data stored in the memory is the favorite settings for the set top box 22. Another type of data in the memory 330 may include the channels subscription data, the blocked channels, adult channels, rating limits set by the set top box 22, current set top box language, prioritizer data, TV resolution data, to do list data, the conditional access module identifier, time zone data, time of day daylight savings, status data, aspect ratio data, viewing hours data, quick tune list and a zip code.

The memory 330 may also store the advanced program guide data. The memory 330 may store program guide data that is received at the head end. The program guide data may include amounts of data including two or more week's worth of program guide data. The program guide data may be communicated to the set top box 22 in various manners including through the satellite 18 of FIG. 1. The program guide data may include a content or program identifiers, and various data objects corresponding thereto. The content identifier may include series data. The first 4 digits may, for example, identify the series. The program guide may include program characteristics for each program content. The program characteristic may include ratings, categories, actor, director, writer, content identifier, producer data and event type. The data may also include various other settings.

The memory 330 may also include a digital video recorder 332. The digital video recorder 332 may be a hard drive, flash drive, or other memory device. A record of the content stored in the digital video recorder is a playlist. The playlist may be stored in the DVR 332 or other parts of memory 330.

The set top box 22 may also include a user interface 350. The user interface 350 may be various types of user interfaces such as a keyboard, push buttons, a touch screen, a voice activated interface or the like. The user interface 350 may be used to select a channel, select various information, change the volume, change the display appearance, or other functions. The user interface 350 may also be used for selecting recommendation and providing feedback for recommendations as will be described below.

A network interface 352 may be included within the set top box 22 to communicate various data through the networks 36/44 described above. The network interface 352 may be a WiFi, WiMax, WiMax mobile, wireless, cellular, or other types of communication systems. The network interface 352 may use various protocols for communication therethrough including, but not limited to, hypertext transfer protocol (HTTP).

The set top box 22 may also include a conditional access module 360. The conditional access module 360 prevents unauthorized reception of the television signals through the antenna 24. The conditional access module 360 may use a cryptographic hash to authorize the use and display of the received signals.

Figure 4:
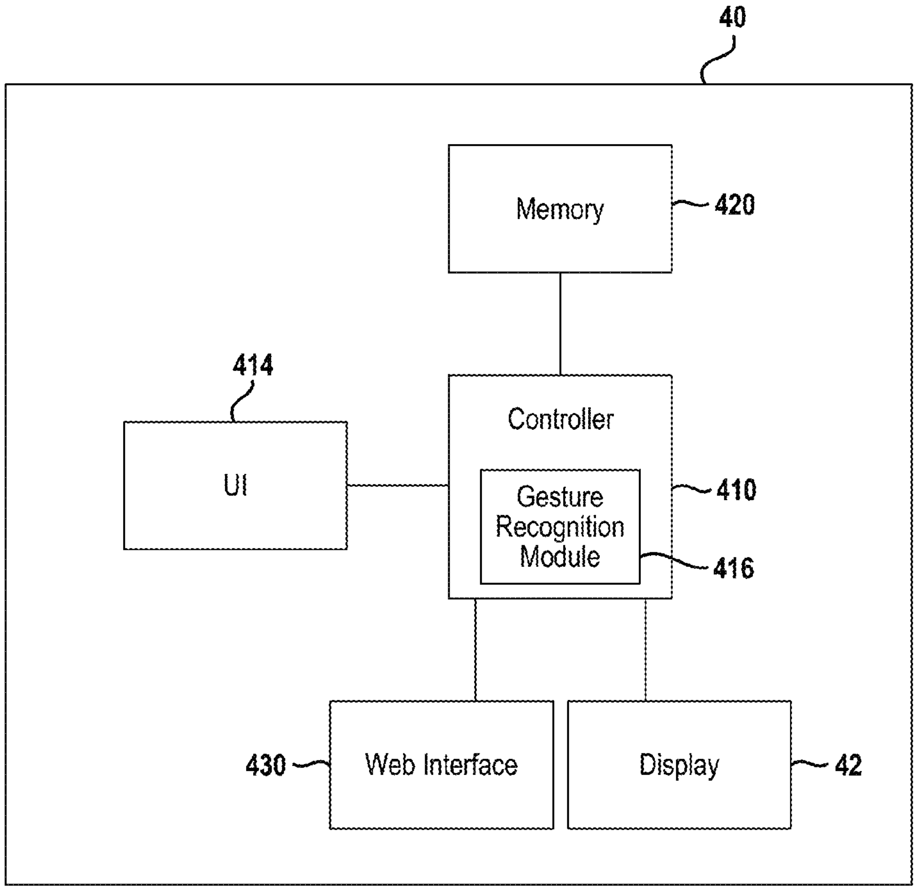
FIG. 4 is a high-level block diagrammatic view of a second screen device of FIG. 1.

Referring now to FIG. 4, a block diagrammatic view of the second screen device 40 illustrated in FIG. 1 is set forth. As mentioned above, the second screen device 40 is a user device that includes a display or screen. The second screen device 40 may be a tablet computer, a laptop computer, a mobile phone, or the like. One example of such a device is an iPad® Apple Corp. The second screen device 40 includes a controller 410. The controller 410 may include a central processing unit that is microprocessor-based. The controller 410 performs various functions including controlling a screen display 42. The controller 410 is also in communication with a user interface 414. The user interface 414 may be one or a combination of different types of user interfaces depending upon the device. Many tablet computers include push-buttons or touch screens or both. Keyboards, styluses and other types of input devices may also be used as a user interface 414 of the second-screen device. The user interface 414 is used to provide various inputs and responses to elements displayed on the screen display 42. When the user interface is a touch screen or touch display, the screen display 42 and the user interface 414 may be one in the same. More than one user interface 414 may be incorporated into the second screen device 40.

The controller 410 may include a gesture recognition module 416. A gesture originates from a bodily motion associated with a touch screen. Gestures are interpreted by a mathematical algorithm within the gesture recognition module 416. Various types of gestures may perform various functions depending upon the screen display. In the present example, a media player may be sized by "pinching" or "spreading" the media player window. Touching, sliding or other gestures may be performed with the different meanings based on the screens displayed and the context. Other gestures, such as a swipe gesture, also move or initiate a particular procedure. Touching the touch pad in a particular location may activate a menu. In the present example, a combination gesture such as a touch followed by an upward swipe motion on the screen display may communicate a tune signal to the set top box. The gesture recognition module 416 mathematically recognizes a touching or a plurality of touchings of the touch screen and initiates a function performed by the controller 410 in conjunction with other modules within the second screen device 40.

A memory 420 is also in communication with the controller 410. The memory 420 may include different types of memory that store different types of data. The memory 420 may store operating software for the device, operating data, user settings, video, music, documents, and applications. The applications may perform various functions, including an application for communicating with a set top box 22 illustrated in FIGS. 1 and 3 and obtaining data from the set top box and data services center. The application may allow the second screen device 40 to communicate directly with the data service center 50. A web interface 430 may be used for communicating with the data services center 50 and the set top box 22. The web interface 430 may allow a connection to the network 36 and network 44. The web interface 430 may allow communication through a wireless network such as a local area network, a wide area network or a mobile or cellular network.

In the present example, the controller 410 allows the user to customize the screen display 42 to display various types of data in a user-controlled format. That is, the screen display 42 may be customized to display the data desired by the user. The second screen device 40 may act as an extension of the set top box 22 and display 30 as illustrated in FIG. 1 to display additional information about the programming shown through the set top box 22. The data is received through the web interface 430.

Figure 5:
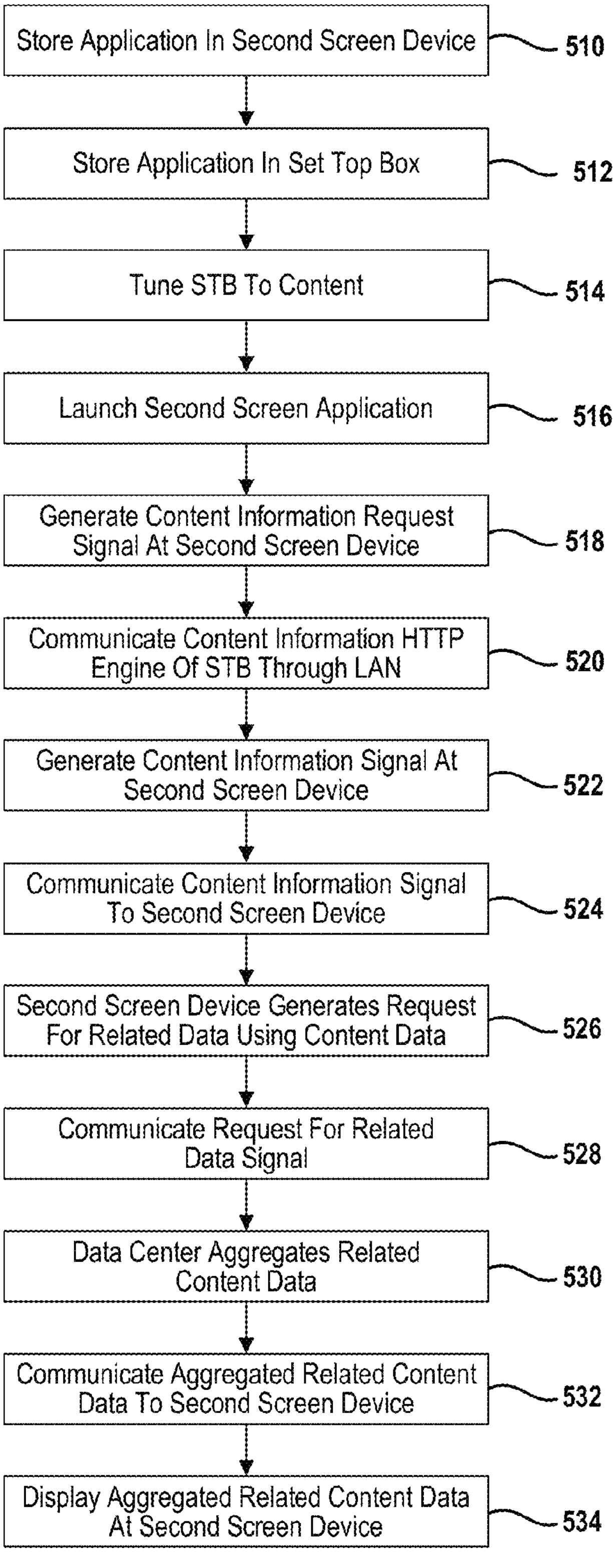
FIG. 5 is a flowchart of a method for displaying related data on a second screen device associated with the set top box.

Referring now to FIG. 5, a method for using the second screen device 40 to display related content to enhance the viewing experience of the user is set forth. Different types of data from different sources may be displayed on the second screen device.

In step 510, an application is stored in a memory of the second screen device 40. An application is a program that interacts with the user interface and the controller to perform a function. In this example, the second screen device and the set top box interact to receive and transmit specific content data using the application. In step 512, an application is stored in the set top box. The application in the set top box, in this example, allows the set top box to communicate with the second screen device and provide data thereto. The data may be data about or related to video content. Also, the application within the set top box controls the display associated with the set top box to display various data associated with the application.

In step 514, the set top box is tuned to various content. The set top box may be tuned to live television which is referred to as linear content. The display associated with the set top box may thus display content in real time. The set top box may also be used to playback content from a digital video recorder. Thus, content stored within the digital video recorder is played back and displayed on the screen display. The content displayed on the screen display may have a content identifier associated therewith. The content identifier and other metadata may be displayed but, is used to identify the content. The broadcasting system typically associates a content identifier with the content.

In step 516, a second screen application is launched at the second screen device. The process for authentication and the like is set forth in greater detail below. In step 518, a content information request signal is generated at the second screen device. The content information request signal may be communicated to the HTTP engine of the set top box. The content information request signal may thus use HTTP to configure the request. In step 520, the content information request signal is communicated to the HTTP engine of the set top box through the local area network.

In step 522, a content information signal is generated at the set top box. The content information signal may include a content identifier corresponding to the content being displayed from the set top box. That is, the content information signal may include a content identifier. The content identifier may be an alphanumeric identifier uniquely identifying the content being displayed through the set top box. Other information may also be included in the content information signal including program characteristics including a series identifier, episode identifier, event type identifier, date identifiers, ratings, category, actor, director, writer, title and the like. The content information signal may also include channel data. The channel data may include a channel identifier for the channel to which the set top box is currently tuned. The channel data may also include the channel or network or both from which the content was recorded when a recording is played back through the set top box. The show or content name and episode data may be used for identifier rather than an alphanumeric identifier.

In step 524, the content information signal is communicated to the second screen device. The content information signal may be communicated through the HTTP engine 316 illustrated in FIG. 3. Thus, the content information signal may be formatted in an HTTP format.

In step 526, the second screen device receives the content information signal and generates a request for related data signal using the content data received in the content information signal. The second screen device may generate the request for related data in an HTTP protocol. In step 528, the request for related data signal is communicated to the data services center 50 illustrated in FIG. 1. The data services center 50, as mentioned above, may be part of the head end 12 or a separate server. The request for related data signal may be communicated through the local area network 44, the router 46 and the network 36 illustrated in FIG. 1.

In step 530, the data center aggregates related content data from various sources. As mentioned above, the data sources 52 may comprise various websites and the like. A social media website may also be used for the aggregated data. The content may be aggregated and coordinated based upon a content identifier. The data services center 50 may aggregate data upon request or may aggregate data continually so that it is available upon request. The aggregated data may include, but is not limited to, pictures, social commentary, trivia, ratings, merchandize procurement services, or other types of data.

In step 532, the aggregated related content data generated in step 530 is communicated to the second screen device. The aggregated related content data may be communicated directly to the second screen device using HTTP. In step 534, the aggregated related content data at the second screen device is displayed. As will be described further below, the data may be displayed in user-selectable modules corresponding to the specific type of data.

Figure 6:
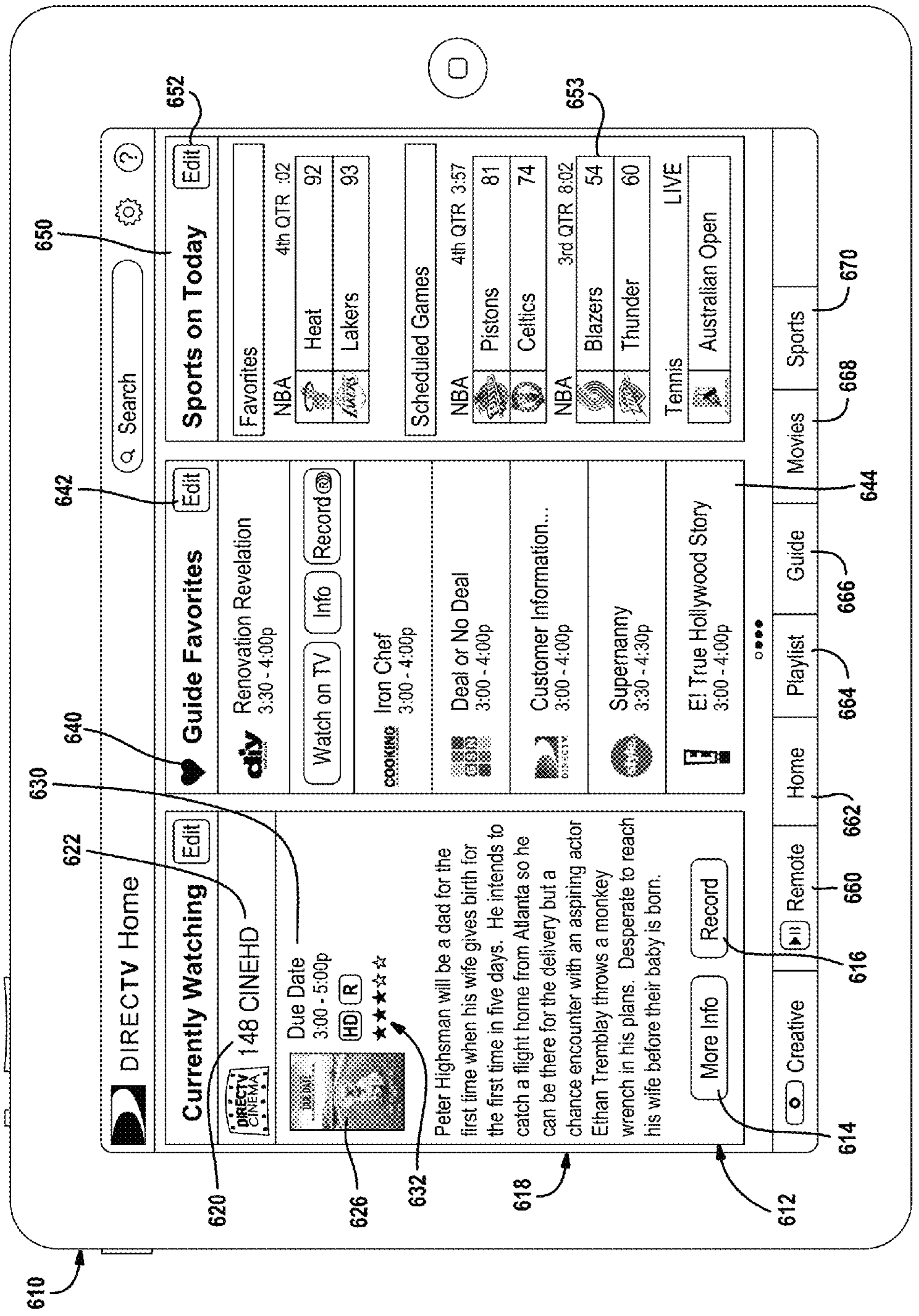
FIG. 6 is a screen display illustrating having various modules displayed thereon.

Referring now to FIG. 6, a screen display 610 is illustrated having various modules displayed thereon. The screen display 610 displays a homepage for DIRECTV® service referred to as DIRECTV® Home. As mentioned above, various modules may be displayed at any one time. A Currently Watching module 612 is displayed as mentioned above the set top box identifies to the second screen device the program currently being watched. The program being watched may be a linear broadcast or programs recorded on the set top box. An information button 614 and a record button 616 may also be displayed along with data in a data portion 618. The more information button may be selected to obtain more information regarding the program currently being watched. The record button 616 may initiate a recording sequence for scheduling recording of the current program. Other data that may be displayed are the channel number 620, the channel name 622, and an image 626 corresponding to the current program. A title and time section 630 may also be used. A ratings indicator may also be displayed.

Another module is a guide listing module. In the present example, the guide listing module is displaying guide favorites (favorite channel listings). The guide favorites may be user-selected using the edit button 642. The edit button may be used to select the favorite channels. The edit buttons may also be used to select the favorite programs, or pre-canned lists like news, programs and children's programs. In this example, guide favorites are displayed for a predetermined channel in a channel module box 644. When a channel module box is selected using the user interface such as the touch screen, further information and details about the particular channel or program may be displayed within the guide listing box 640. Recording options may also be provided when further details is displayed.

Another module is a sports module 650. The sports module 650 may be configured in various manners according to user selections by using the edit box 652. The sports module 650 may generate sports scores for current events as well as listings for future events. By selecting any one of the sports boxes 652, further information may be obtained by the second screen device. A recording box may also be provided after further information is displayed. The sports module 650 may have scores updated after a predetermined amount of time. For example, the sports may be updated every 45 seconds. Of course, only sports scores with a start time of the current day are updated.

A plurality of tabs 660-670 may be provided at the bottom of the screen display of the second screen device. A remote tab 660 may be selected for a touch screen remote control to be displayed on the display. A home tab 662 may be selected to display the homepage with the user's selection of modules. Default settings may be provided for first-time users. The screen display 610 illustrates the home selection. The playlist tab 664 displays the playlist of the digital video recorder within the set top box. The playlist is a compilation of all of the content recorded on the set top box. Some of these functions will be described further below.

Figure 7:
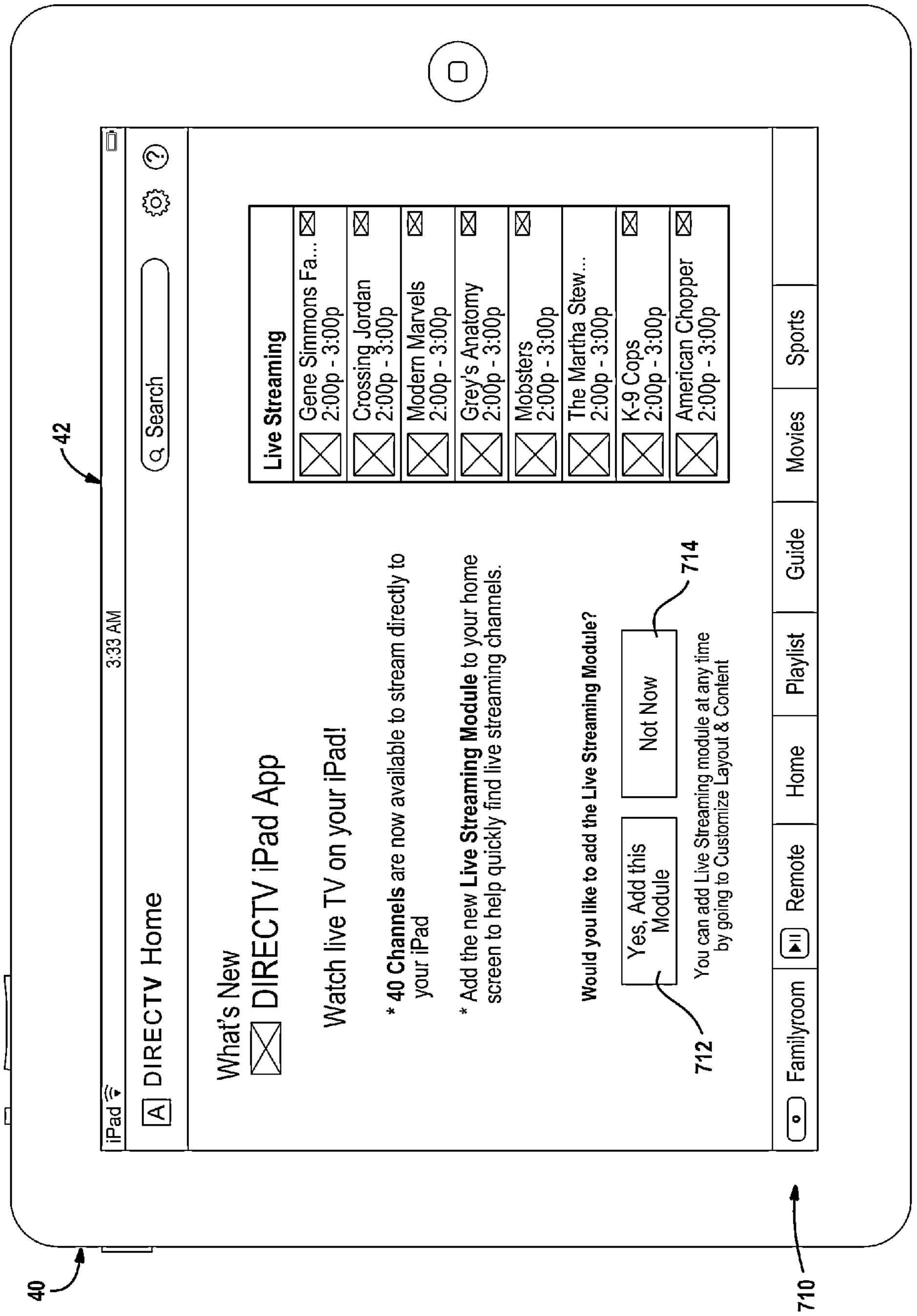
FIG. 7 is a screen display illustrating a welcome screen for installing an application for live streaming.

Referring now to FIG. 7, a second screen device 40 with the screen display 42 displaying an application installation module 710 is set forth. The application installation module 710 includes a positive query button 712 and a negative query button 714 for determining whether live streaming is desired through the device 40. Live streaming allows the second screen device 40 to receive channels from the head end for display on the display 42 associated with the second screen device 40. As will be described below, a media player may be amended that provides an overlay over the existing screen or consume the entire screen.

Figure 8:
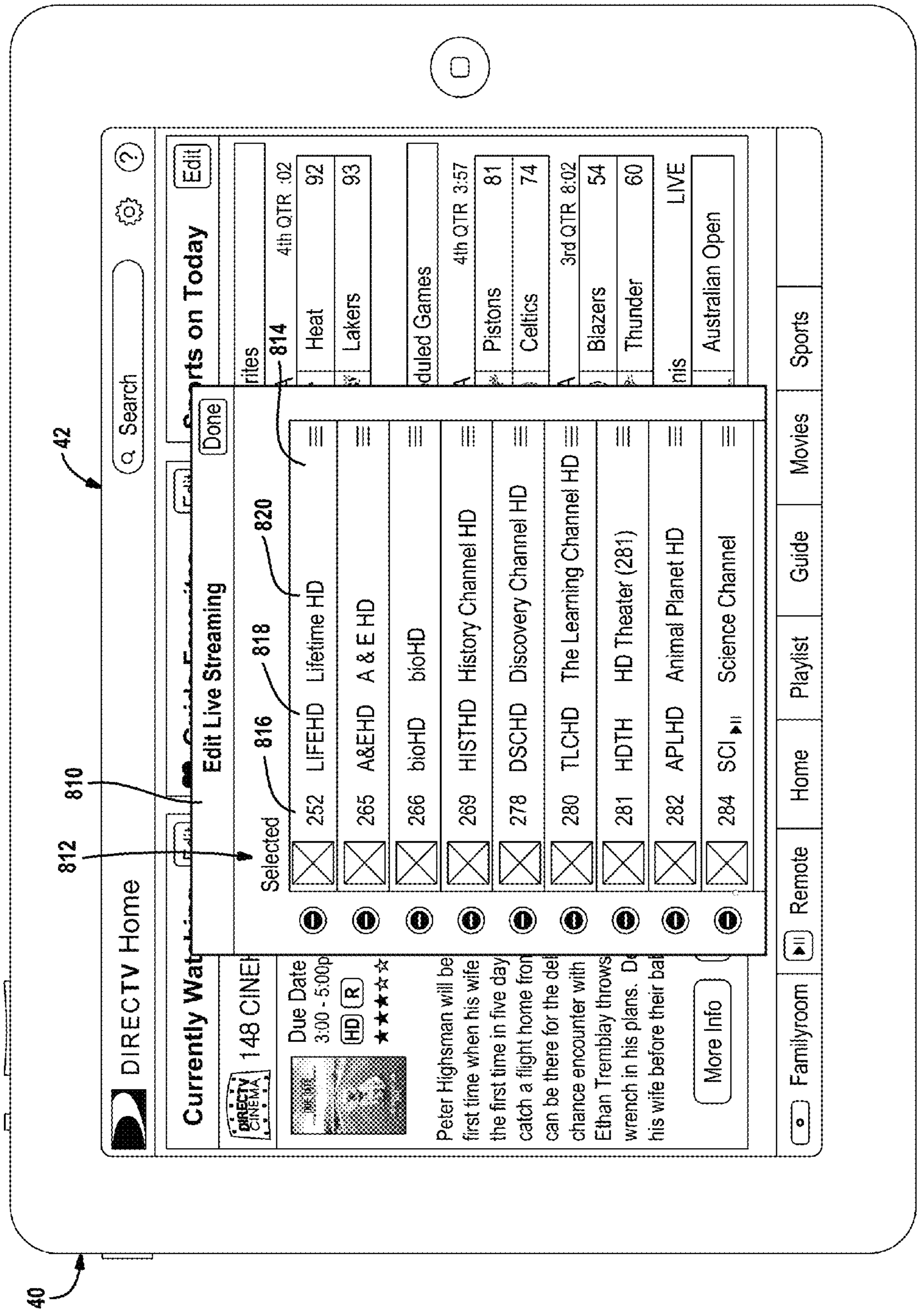
FIG. 8 is a screen display illustrating a channel selection for live streaming.

Referring now to FIG. 8, various channels may be made available for streaming. In box 810, live streaming channels may be edited by selecting the selection boxes 812. Each sub-box 814 includes one selection box 812 and other identifiers such as a channel 816, a network abbreviation 818 and a full channel title 820. By selecting and deselecting the selection boxes 812, a list of channels may be generated. The list may be displayed in a module illustrated in FIG. 6 so that quick access may be provided to the user of the second screen device 40.

Figure 9:
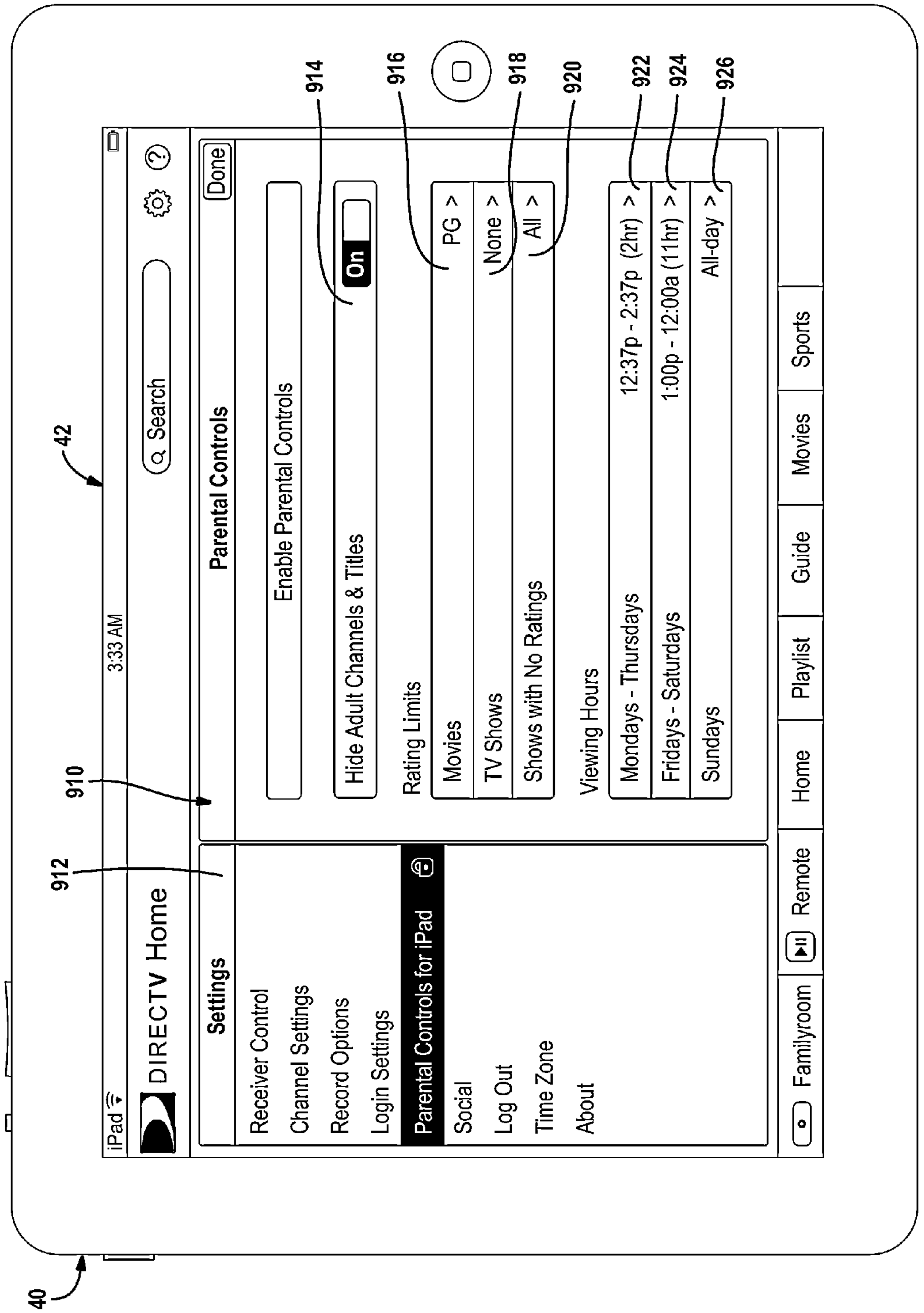
FIG. 9 is a screen display for entering parental controls for a media player for a second screen device.

Referring now to FIG. 9, a media player for displaying streaming channels may also have various parental settings associated therewith. A parental setting control box 910 may be activated from a settings module 912. The parental controls may include controls for hiding adult channels and titles in box 914, controls for setting the movie rating limits in box 916, controls for setting the TV show ratings in box 918 and controls allowing shows with no ratings to be displayed in box 920. Controls for setting viewing hours for Monday through Thursday are in box 922, Fridays and Saturdays in box 924 and Sundays in box 926. The setting of parental controls may be protected by a passcode.

Figure 10:
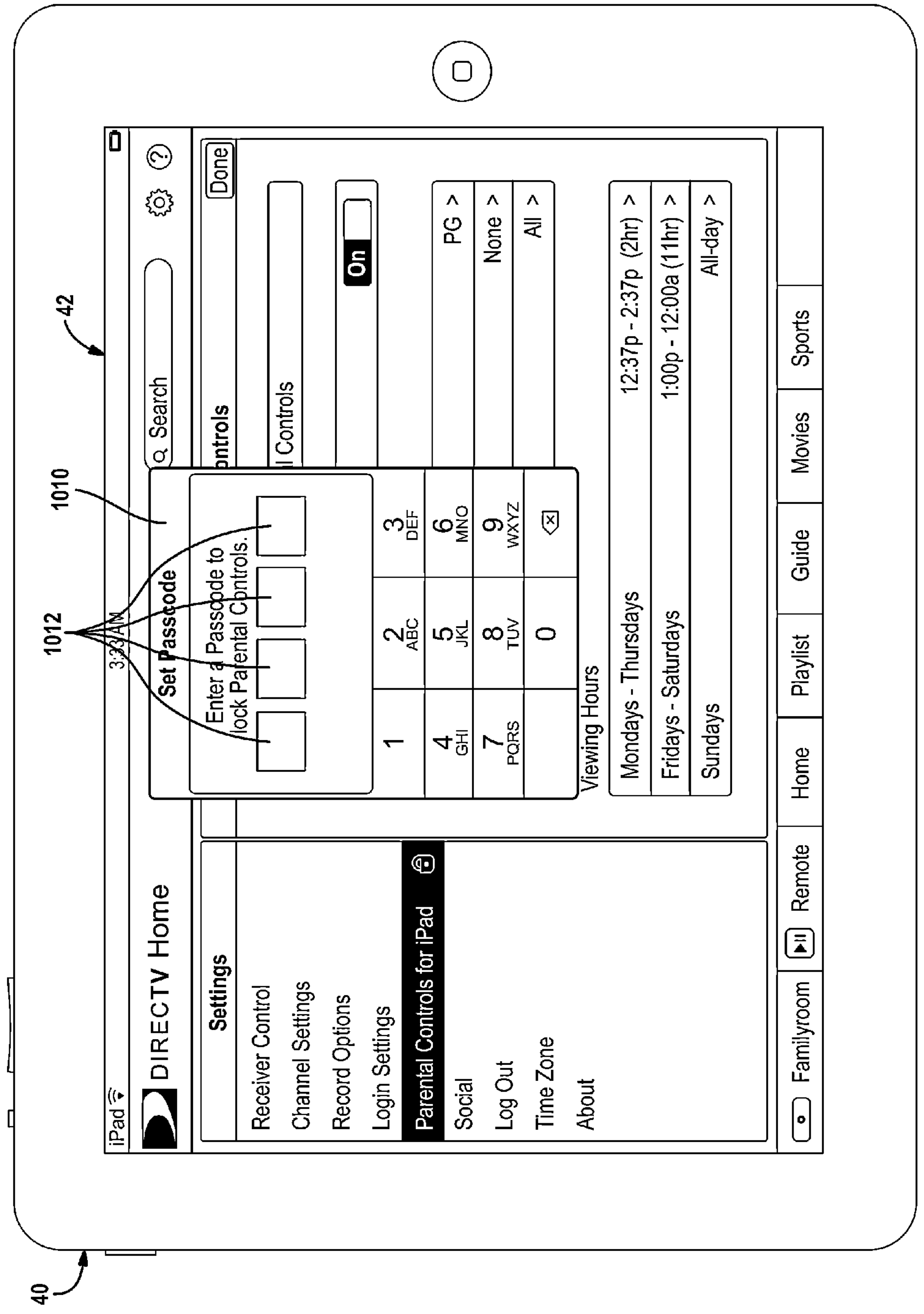
FIG. 10 is a passcode screen that must be chosen to prevent unauthorized changing of the parental controls.

Referring now to FIG. 10, a passcode entry box 1010 provides means for setting a passcode for changing parental controls. Without entering a passcode in the code boxes 1012, the parental controls may not be changed.

Figure 11:
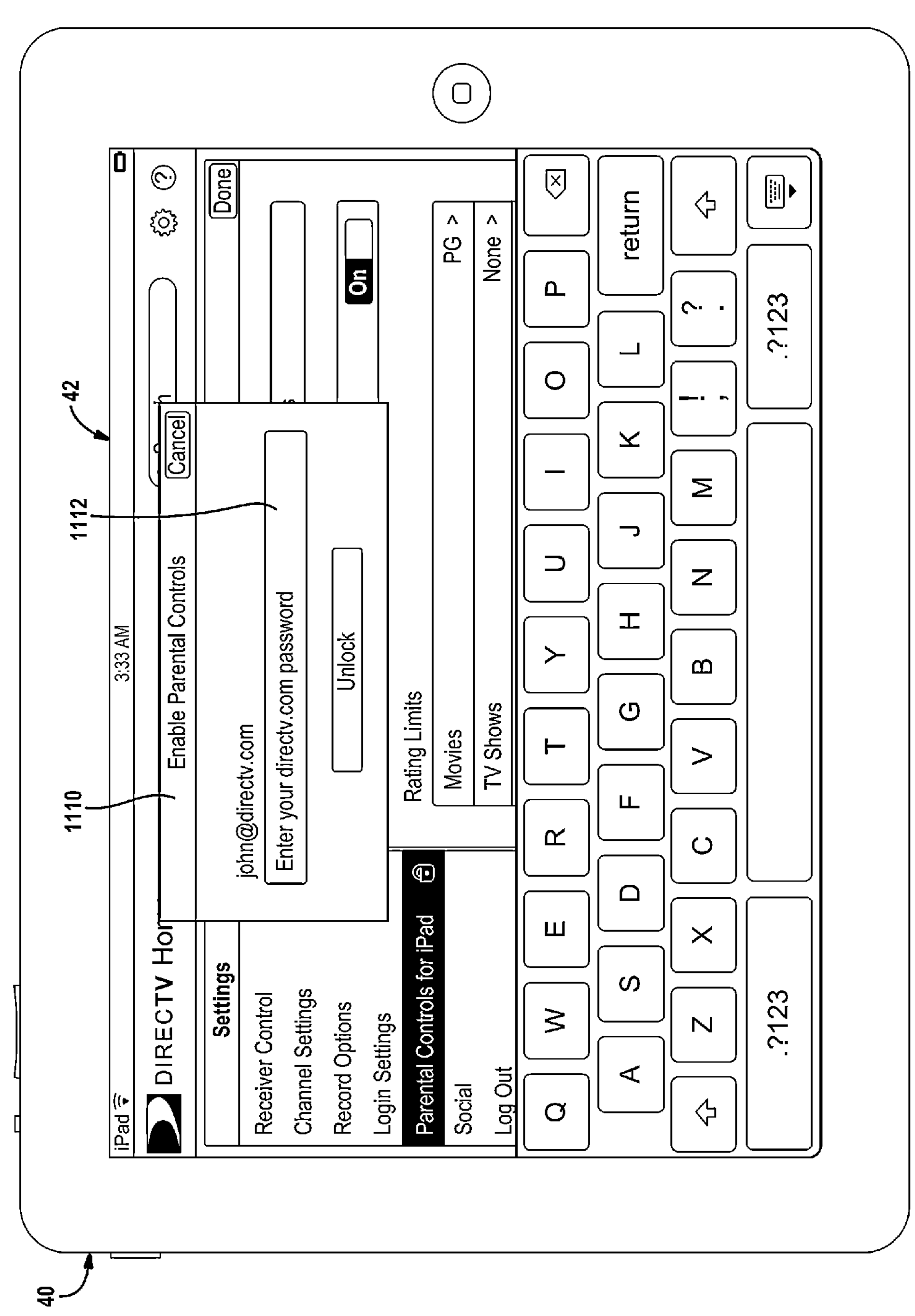
FIG. 11 is a screen display illustrating parental controls using an alphanumeric password.

Referring now to FIG. 11, the parental controls may also be enabled using a password box 1110. The password box 1110 allows a password to be entered in the dialog box 1112. Entering a password in a password box 1110 is an alternative to the passcode of FIG. 10.

Figure 12:
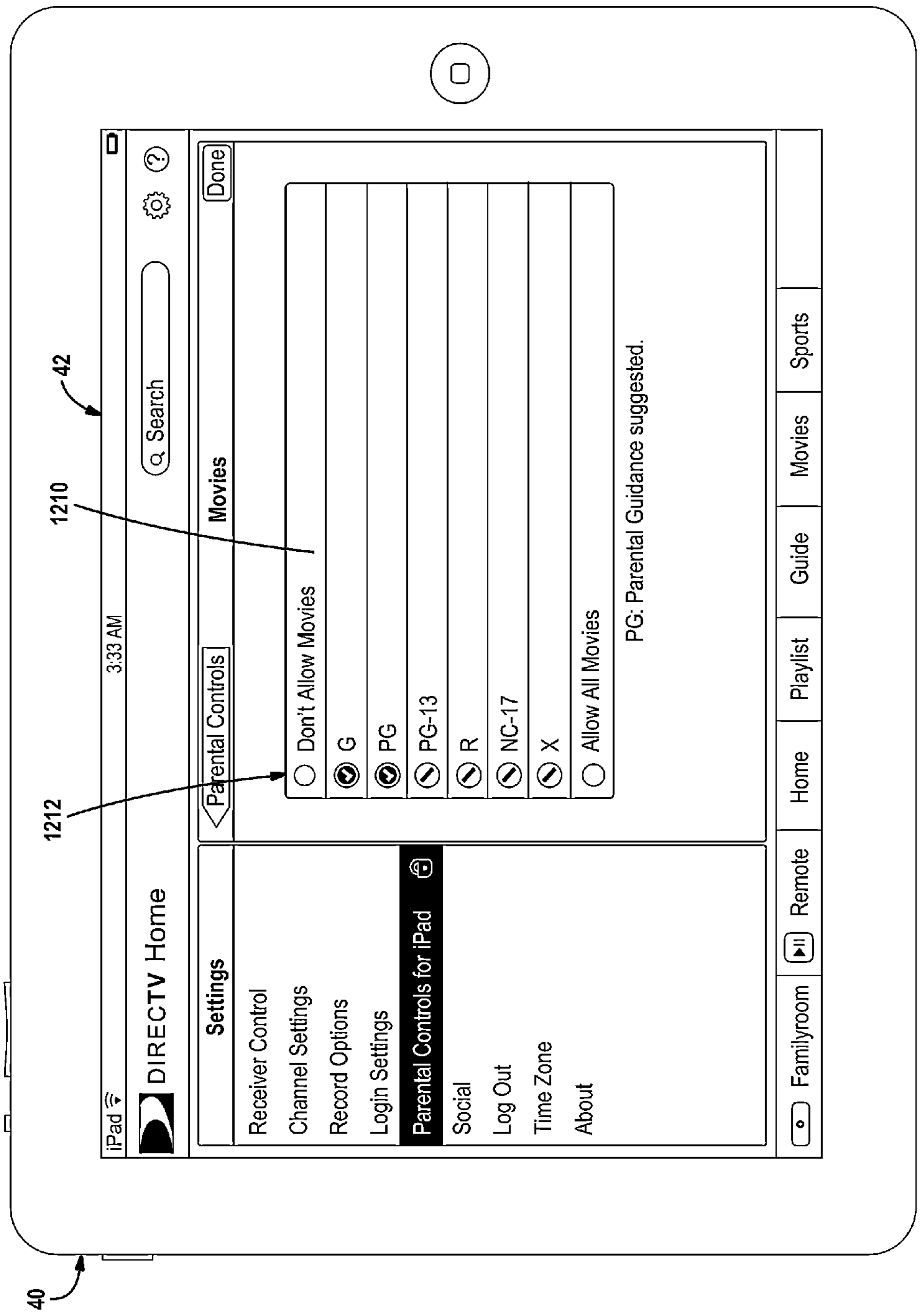
FIG. 12 is a screen display for setting movie ratings for parental controls.

Referring now to FIG. 12, when the movie box 916 is selected in FIG. 9, desired movie ratings may be set in a movie ratings box 1210. Movie ratings may be selected or deselected at the selection buttons 1212. An indicator such as a check for selected and slash for deselected may be used.

Figure 13:
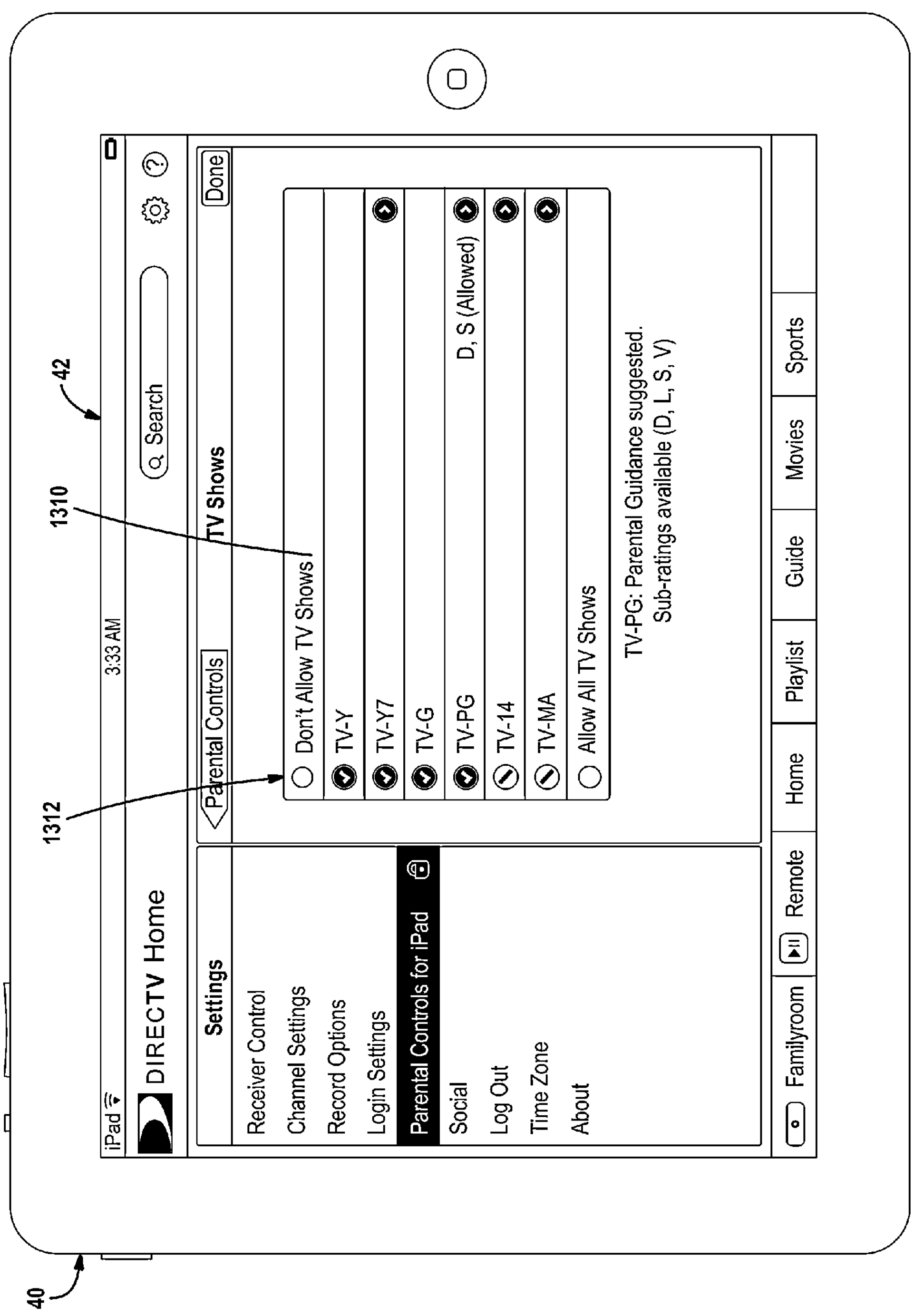
FIG. 13 is a screen display for setting television show ratings for parental controls.

Referring now to FIG. 13, a TV ratings box 1310 may appear when the TV shows box 918 of FIG. 9 is selected. Suitable parental ratings may be selected in the TV show box 1310. An indicator such as a check for selected and slash for deselected may be used.

Figure 14:
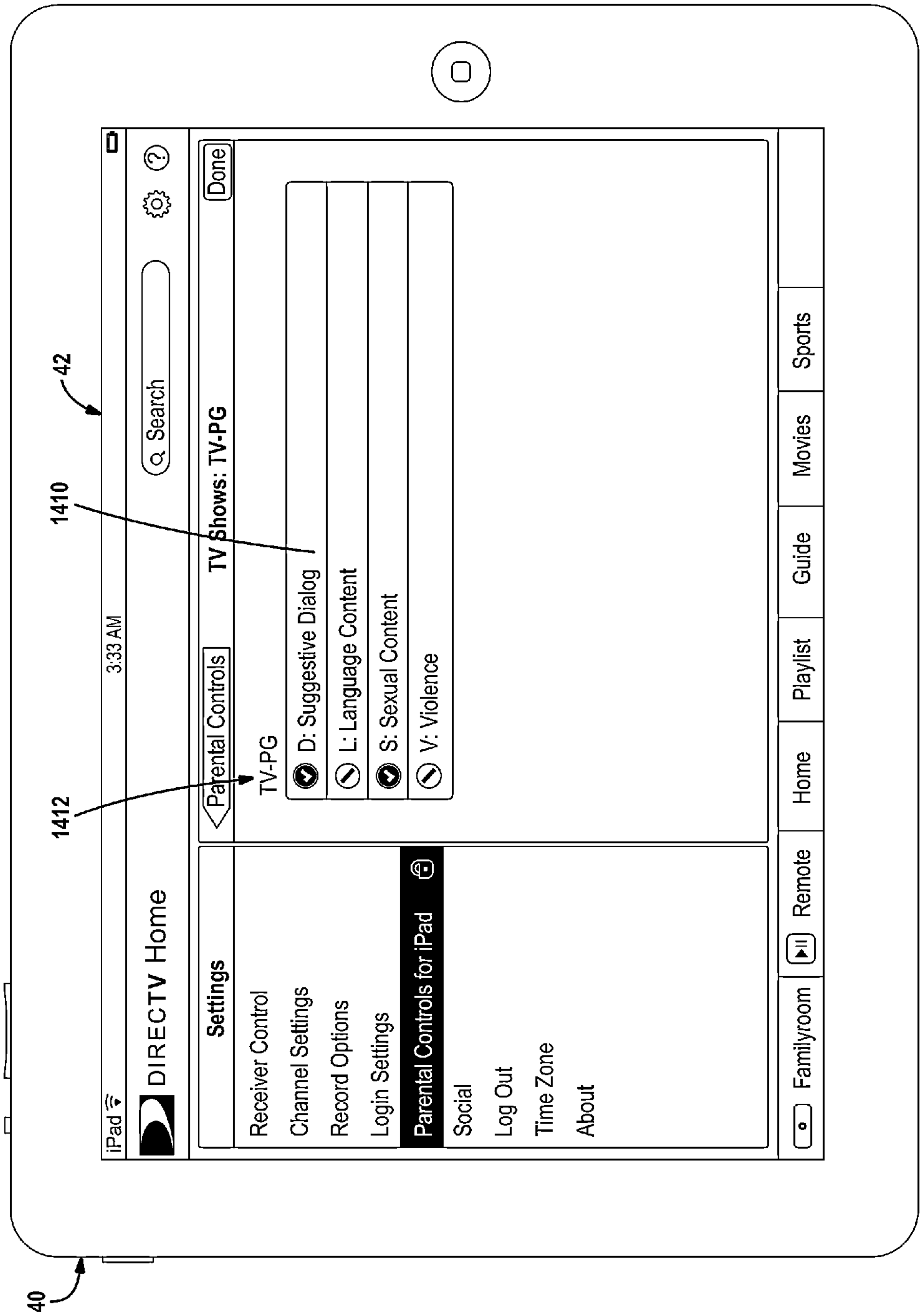
FIG. 14 is a screen display for setting specific settings within the parental guidance setting for television ratings.

Referring now to FIG. 14, each rating may also have specific limitations as shown in the boxes 1410. The rating may be allowed unless certain sub-ratings are present. For example, when TV-PG is selected as viewable from FIG. 13, various types of sub-ratings may be selected as unviewable using the selector buttons 1412. In this example, suggestive dialog and sexual content are allowed to be viewable within the PG category while language content and violence are not allowed to be viewable. Thus, a parent can control allowable sub-ratings.

Figure 15:
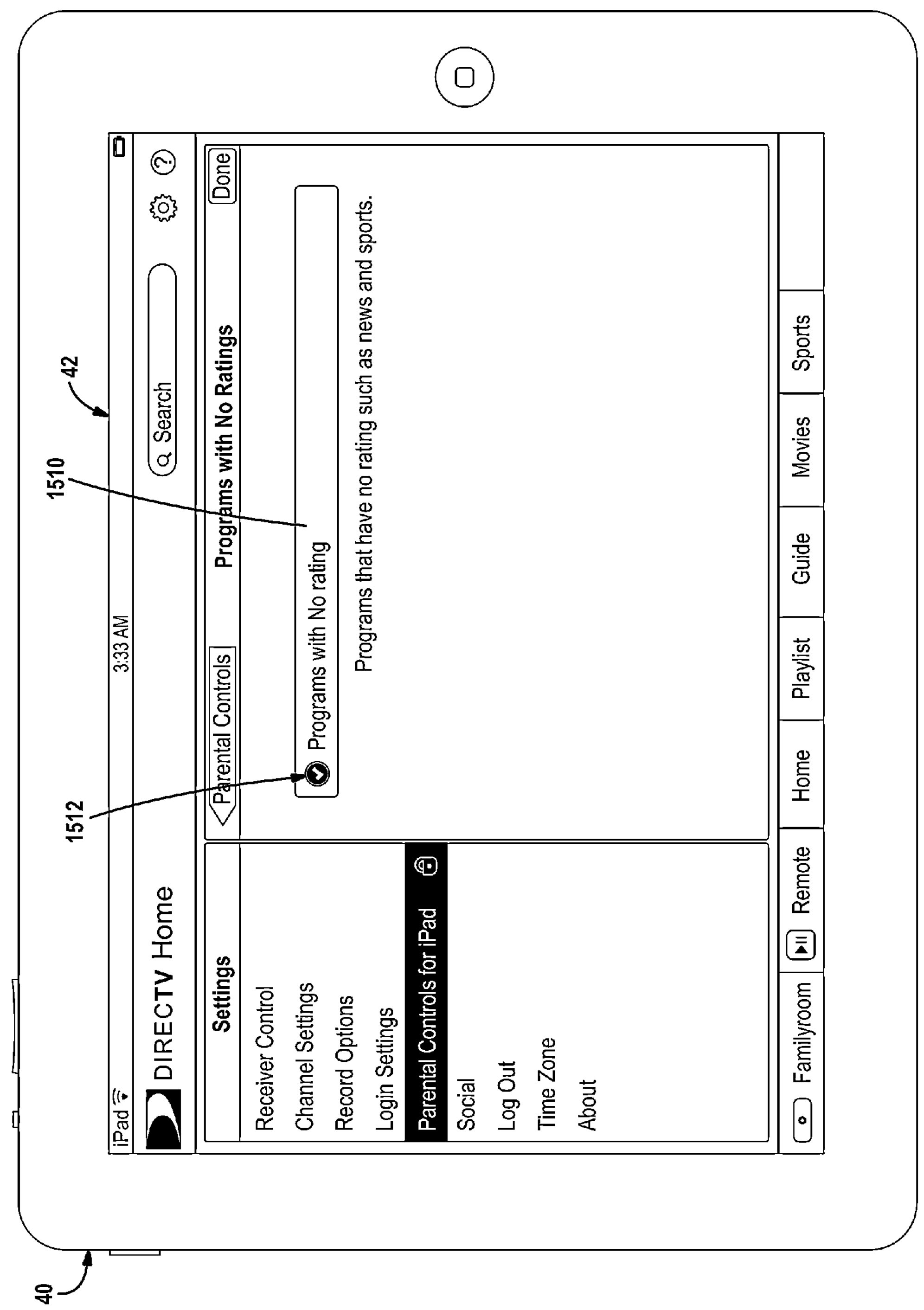
FIG. 15 is a screen display for selecting or deselecting programs with no ratings.

Referring now to FIG. 15, a dialog box 1510 for allowing programs with no ratings to be displayed is set forth. In this example, programs with no ratings are allowed as indicated by the selector button 1512.

Figure 16:
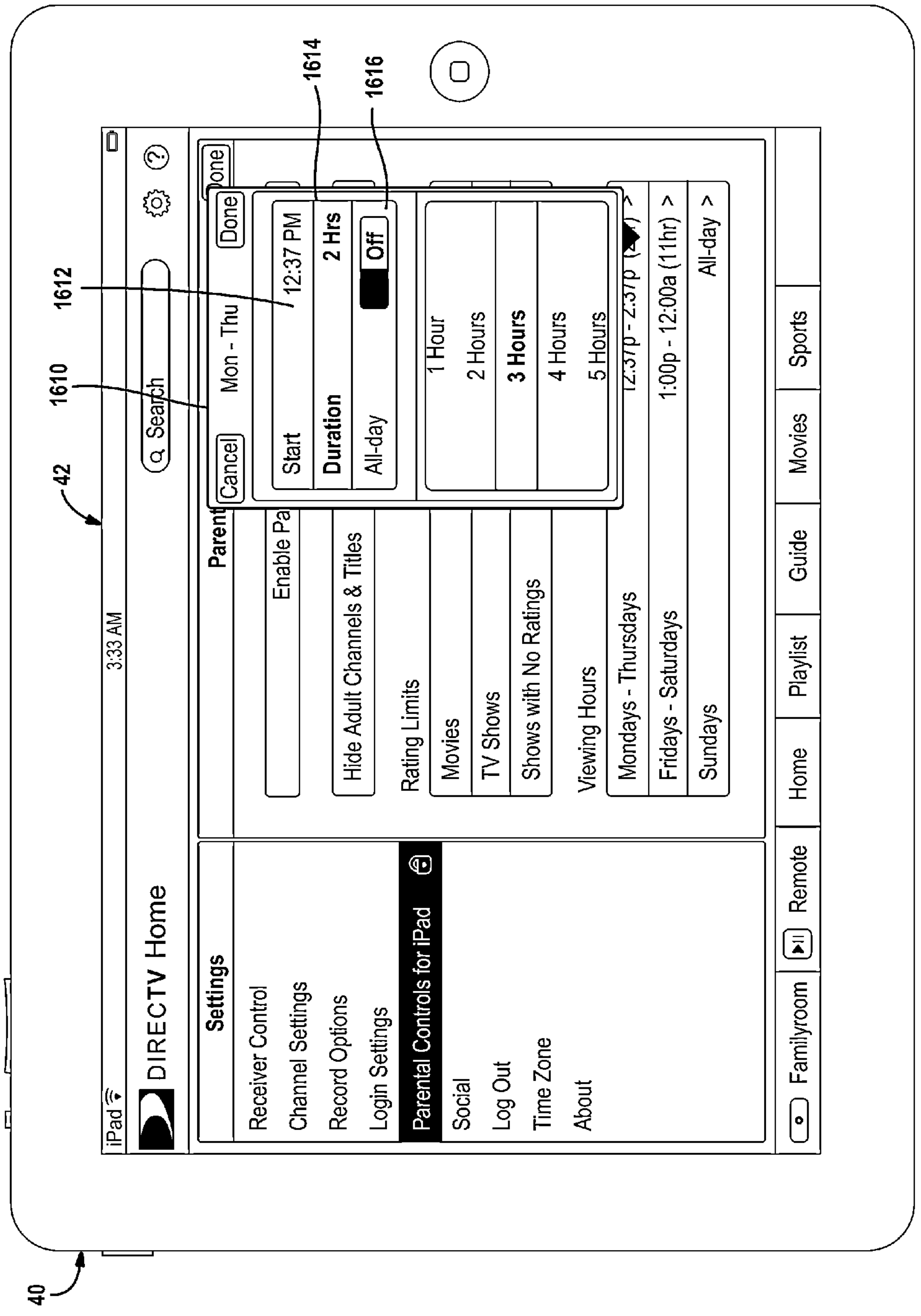
FIG. 16 is a screen display for setting times for viewing within the parental controls.

Referring now to FIG. 16, a timing window 1610 may be generated when one of the viewing hours boxes 922-926 is selected in FIG. 9. In this manner, the time window for viewing hours may be set. The start time may be set in box 1612 and the duration of viewing hours may be set in box 1614. "All day" may be enabled or disabled in box 1616.

Figure 17:
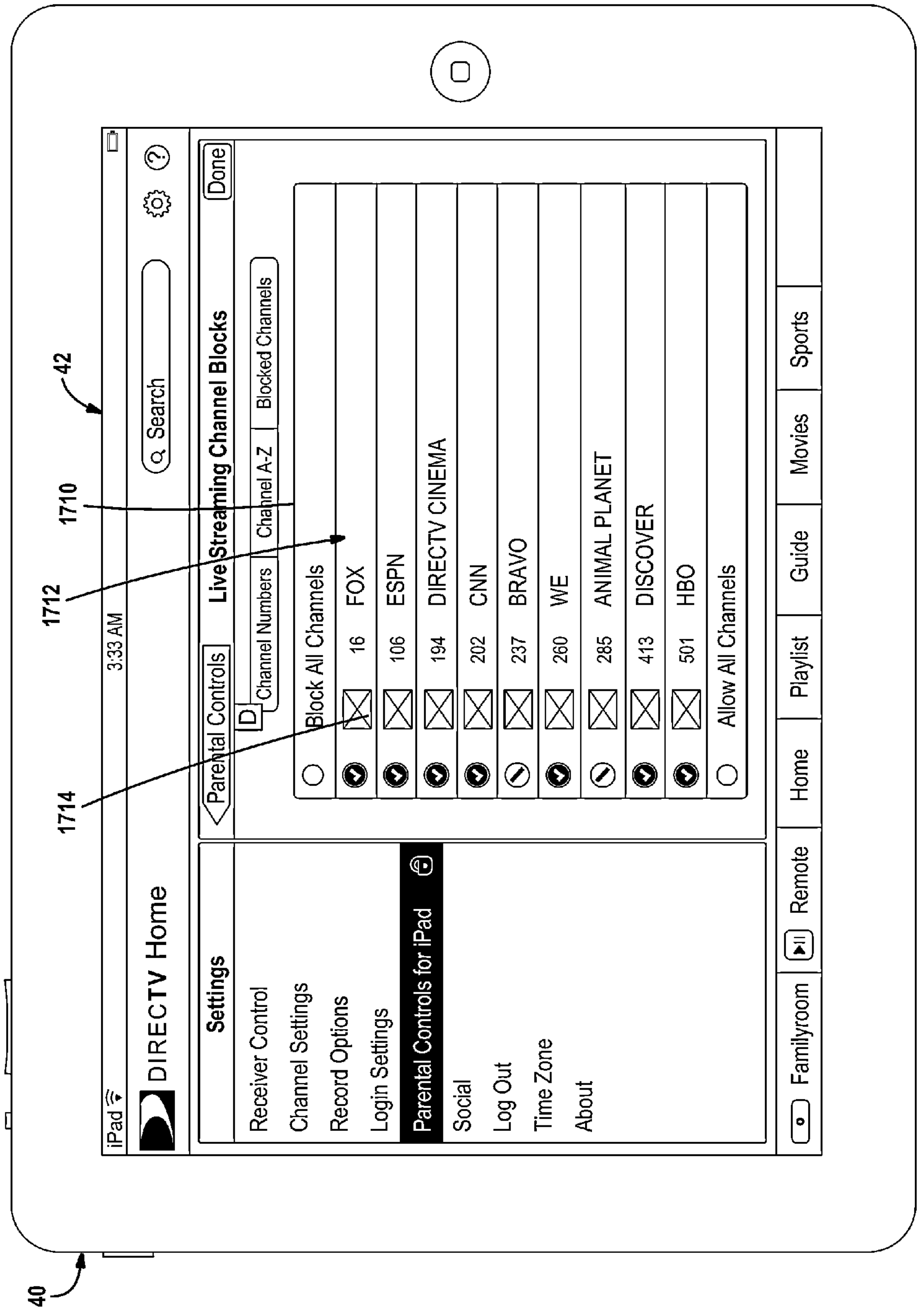
FIG. 17 is a screen display illustrating channels that may be selected or deselected for live streaming according to parental controls.

Referring now to FIG. 17, a channel blocking box 1710 is set forth. The channel blocking box 1710 provides a list of channels 1712 and selection boxes 1714 for selecting and de-selecting channels to be blocked from live streaming. In this example, all channels that the user is subscribed to may be displayed. All channels may be defaulted in an allowable state. By selecting the selection boxes 1714, the allowed or disallowed state may be changed.

Figure 18:
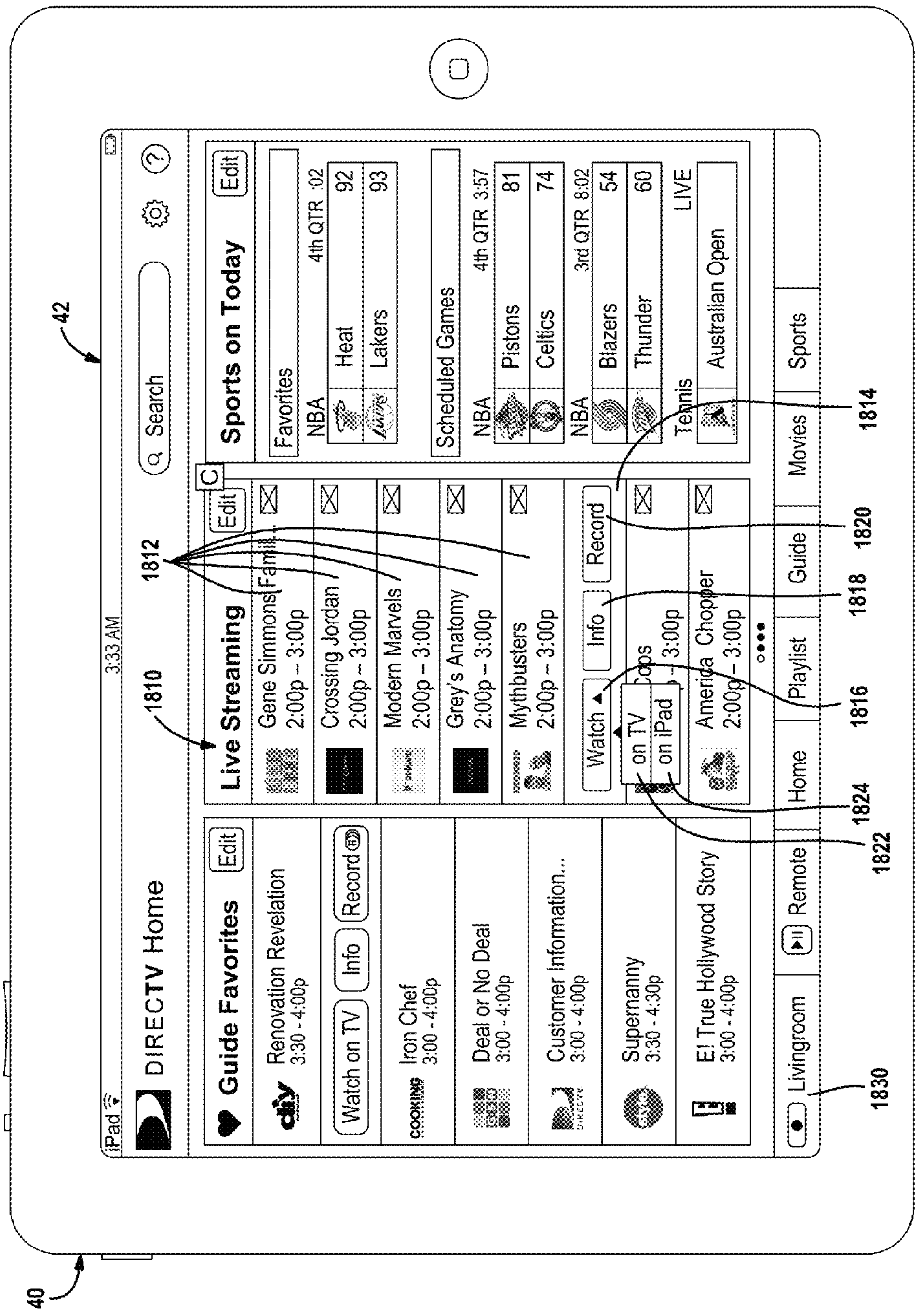
FIG. 18 is a screen display for selecting channels to stream or not stream in a list of available channels.

Referring now to FIG. 18, the second screen device 40 having the screen display 42 is illustrated having a live streaming module 1810. The live streaming module 1810 has "The Dan Patrick Show" selected. Each of the other titles in the live streaming module 1810 has not been selected. When a particular title box 1812 has been selected by a gesture, a control box 1814 may be displayed. Selection of a title box 1812 may be performed by touching a title box 1812. The control box 1814 may include various buttons including a watch button 1816, an info button 1818 and a record button 1820. By selecting the watch button 1816, two different selections may be enabled in this example. The watch button 1816 may be expanded to include an "on-TV button" 1822 and an "on-iPad® button" 1824. By selecting one of the two buttons 1822, 1824 associated with the watch button 1816, the particular content corresponding to the particular channel may be watched on either the television associated with the set top box or on the iPad®. That is, the second screen device 40 may receive an IP stream from the head end corresponding to a channel on which the particular content title is being broadcasted. By selecting the "on-TV" button, the controlled set top box may be tuned to the desired channel for the content. As is illustrated in FIG. 18, a set top box selection box 1830 is illustrated. In this example, "family room" is selected which corresponds to a particular set top box such as in the family room. Other set top boxes in a household or system may be controlled. The controlled set top box may be changed by selecting the button 1830.

By selecting the "info" button 1818, information corresponding to the particular content may be displayed. As mentioned above, different types of information data may be displayed including actor information, descriptions of the content, maturity ratings, audience ratings, posters and the like. Selecting the "info" button 1818 may initiate a window or module to open for display the information data.

By selecting the record button 1820, recording the content in the set top box selected in the set top box selection box 1830 may be provided.

Figure 19:
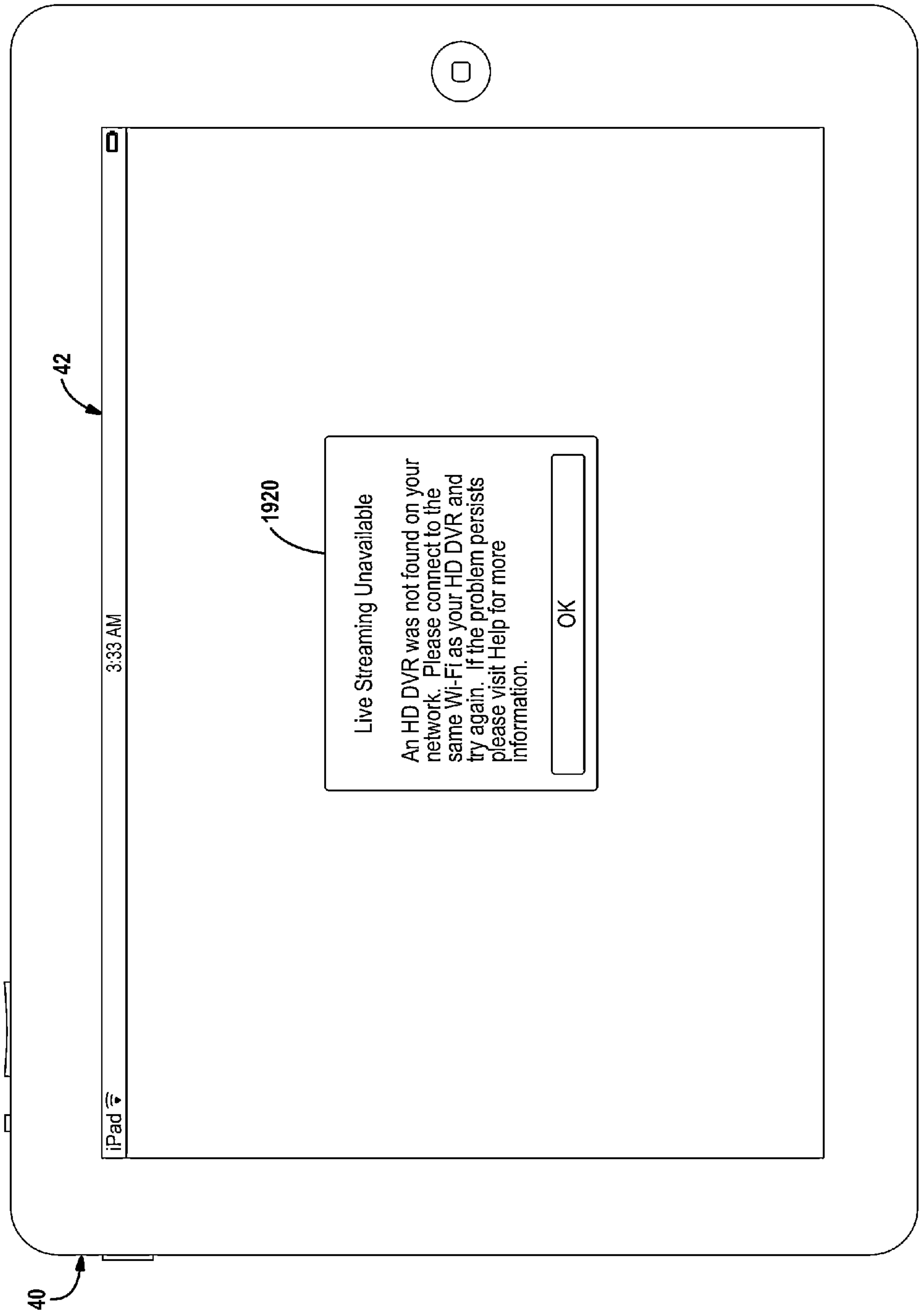
FIG. 19 is a warning screen when streaming is unavailable.

Referring now to FIG. 19, restrictions may be applied to live streaming so that live streaming is only available through the same local area network as the set top box. A warning box 1920 may describe that live streaming is unavailable when not on the same network as a set top box within the system. Of course, this may not be a requirement depending on system requirements.

Figure 20:
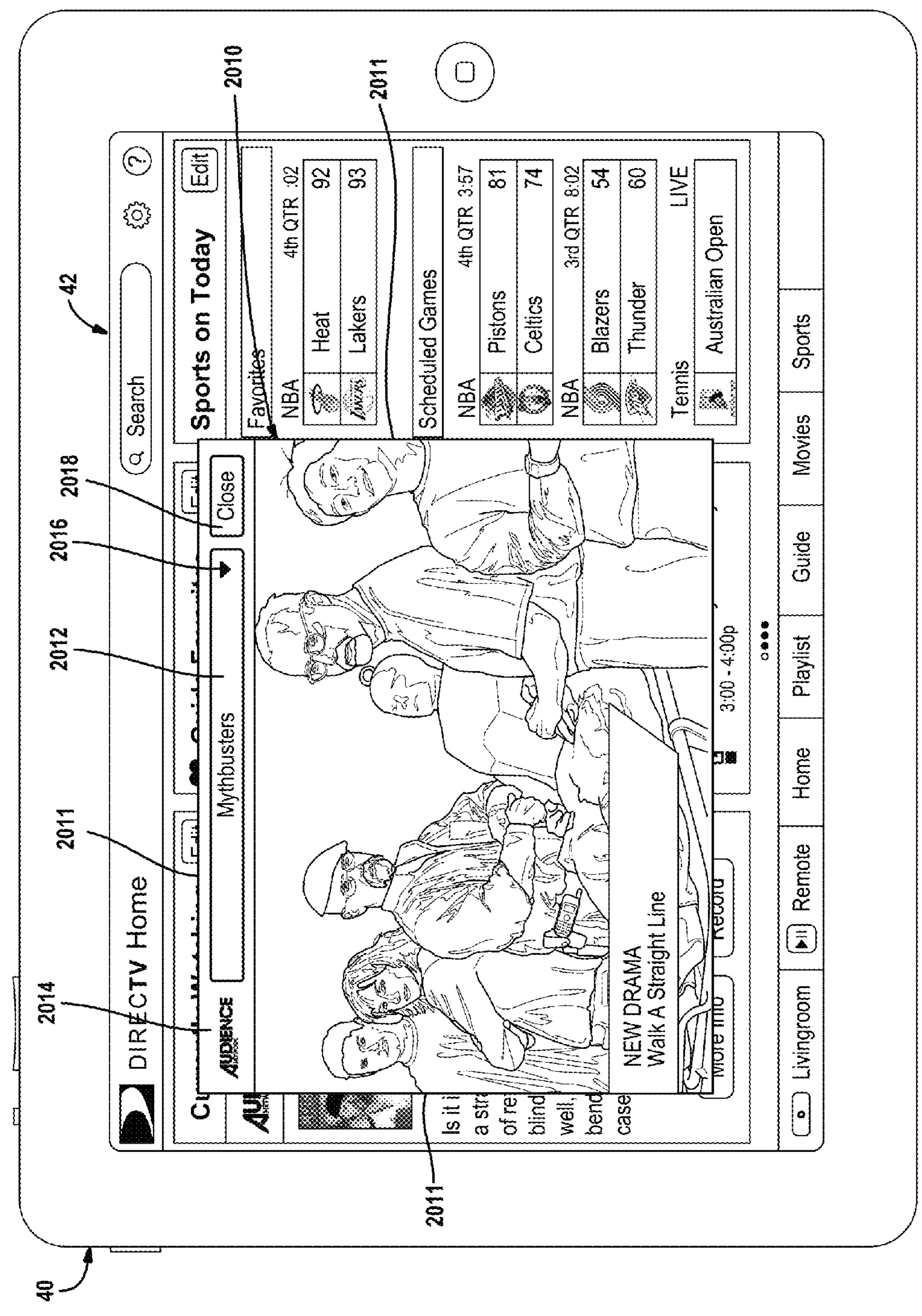
FIG. 20 is a screen display illustrating a media player used for live streaming.

Referring now to FIG. 20, when "watching" on the second screen device is selected from the menu in FIG. 18, a media player window 2010 is displayed. The media player window 2010 displays content streaming from the head end within an area of the touch screen bounded by the media player edges 2011. The media player window may include a title bar 2012 which displays the title of the content. A channel indicator 2014 may also be displayed. An arrow key 2016 may be selected for bring up an additional menu for performing various actions.

The media player window 2010 may be moved or resized using gestures. A close button 2018 may be selected for closing the media player window 2010.

Figure 21:
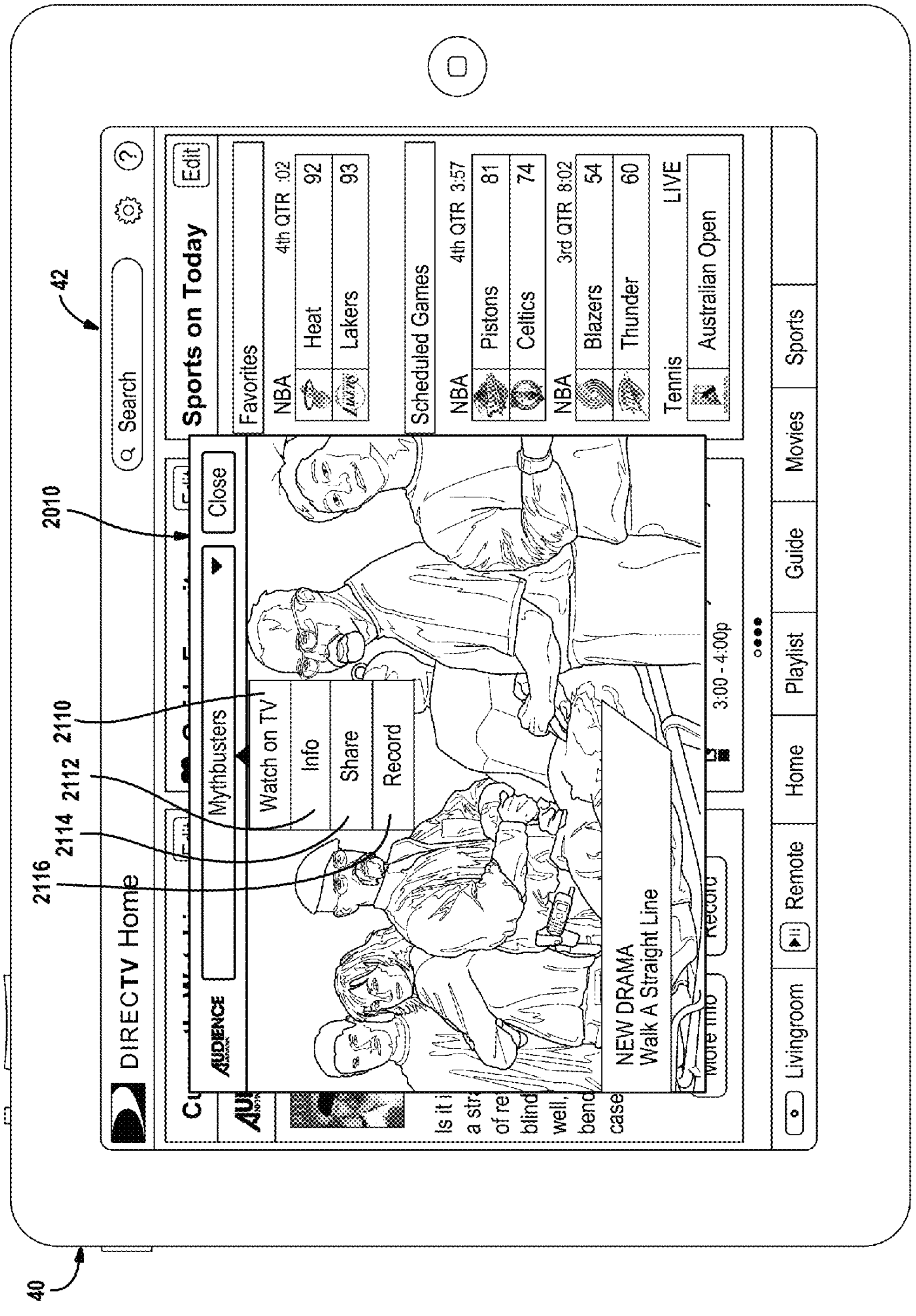
FIG. 21 is a screen display illustrating a pull-down menu for various options to perform with the media player.

Referring now to FIG. 21, a drop-down additional menu displayed in response to selecting the arrow key 2016 is set forth. In this menu, a "watch on TV button" which is a tune selection box 2110 is provided. The tune selection box 2110, when selected, may send a tuning command to the set top box for tuning the set top box to the channel being streamed to the second screen device. However, the set top box may not tune to the streaming channel but rather to the direct connection through the satellite or through a cable head end.

An information box 2112 may also be provided in the dropdown menu. The info button 2112 may allow further information to be displayed on the second screen device. A share button 2114 may use social networking to share the content title with pre-determined friends in a social network setting. A record button 2116 may also be present on the dropdown menu. By selecting the record button 2116, a record command signal may be communicated to the set top box through the local area network. When the record command signal is received by the set top box, one of the tuners is selected to receive the same channel through the satellite or cable network so that the content is recorded in the memory of the set top box.

Figure 22:
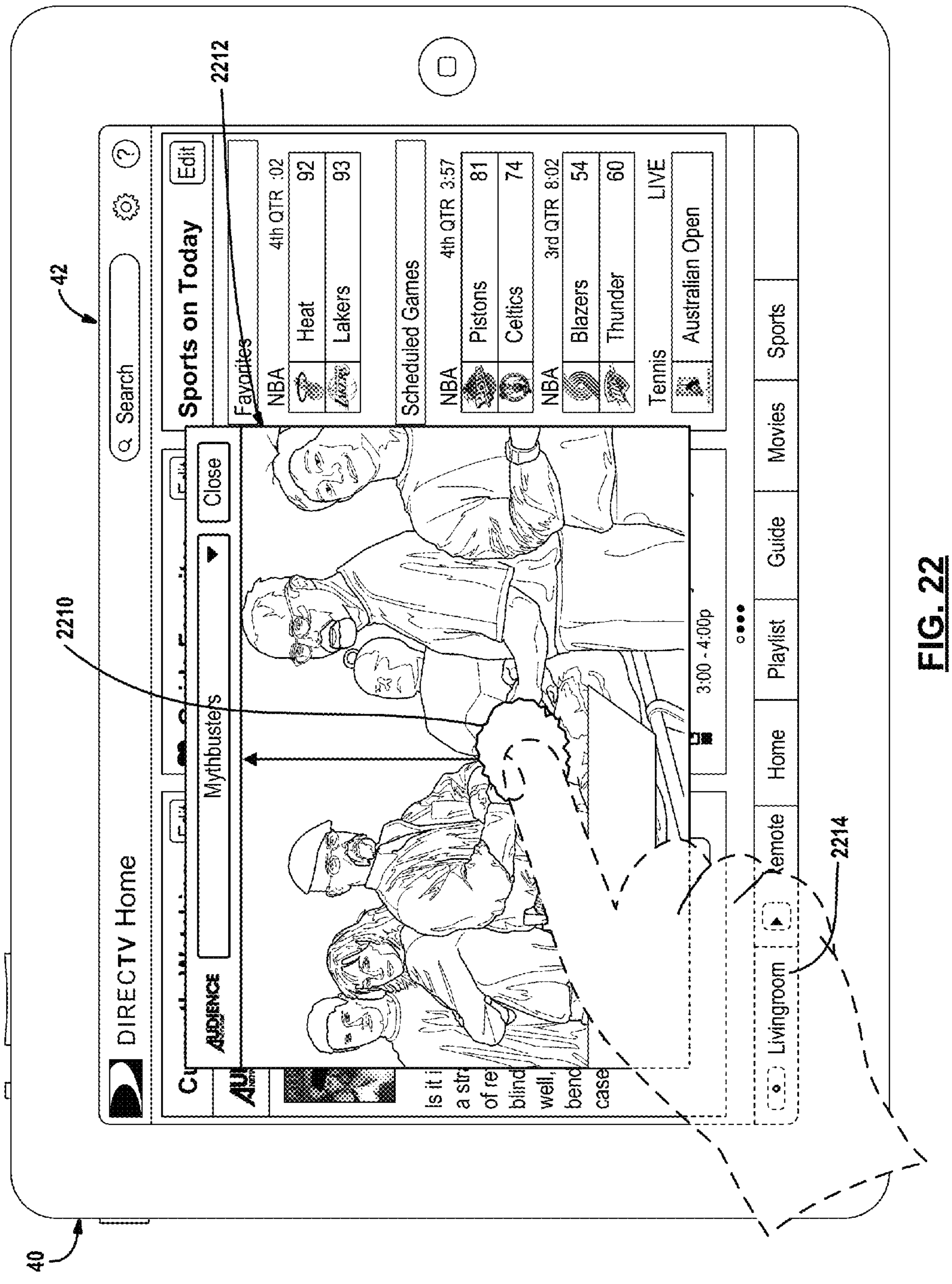
FIG. 22 is a screen display illustrating an indicator illustrating a gesture is recognized.

Referring now to FIG. 22, a gesture indicator 2210 is illustrated within the media player. In this example, the gesture indicator 2210 is displayed in response to a single finger tap for longer than a predetermined amount of time such as two seconds. After the second screen device recognizes the initial gesture, a second gesture comprising a movement in an upward direction as indicated by the arrow 2212 on the touch screen causes the second screen device to generate a tune command. The tune command 2212 may include a set top box identifier corresponding to the connected set top box. In this example, the living room indicator 2214 indicates the living room set top box is in communication with the second screen device. The tune command may thus include an Internet-protocol (IP) address of the living room set top box and a channel identifier or other content identifier. The set top box is then tuned to the channel being displayed on the second screen device.

Figure 23:
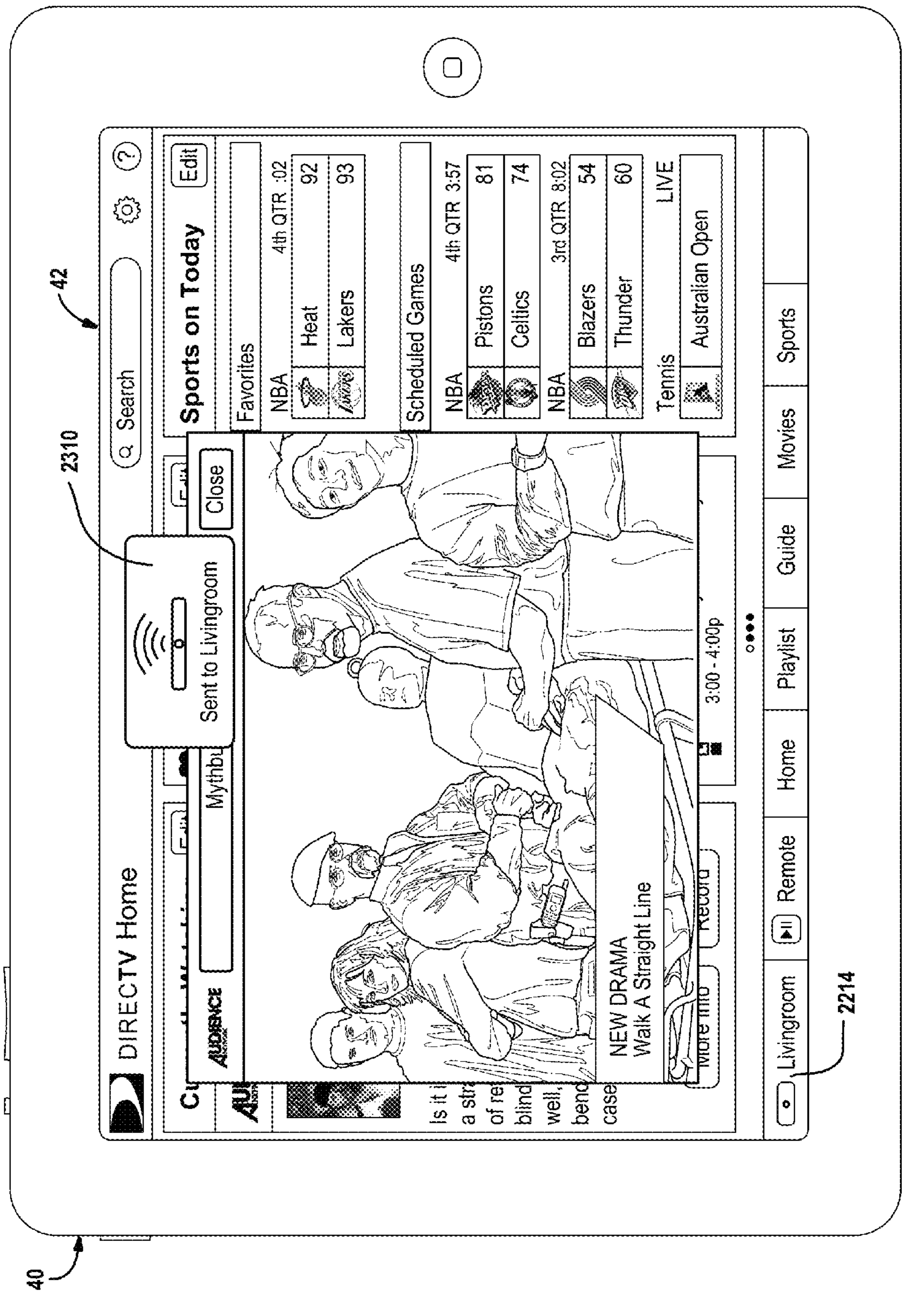
FIG. 23 is a screen display illustrating an indicator that a tune command was sent to a set top box.

Referring now to FIG. 23, an indicator box 2310 may generate an indicator stating that the tune signal has been communicated to a particular device. In this example, the living room is the device being tuned by the second screen device. The indicator may be displayed for a short time.

Figure 24:
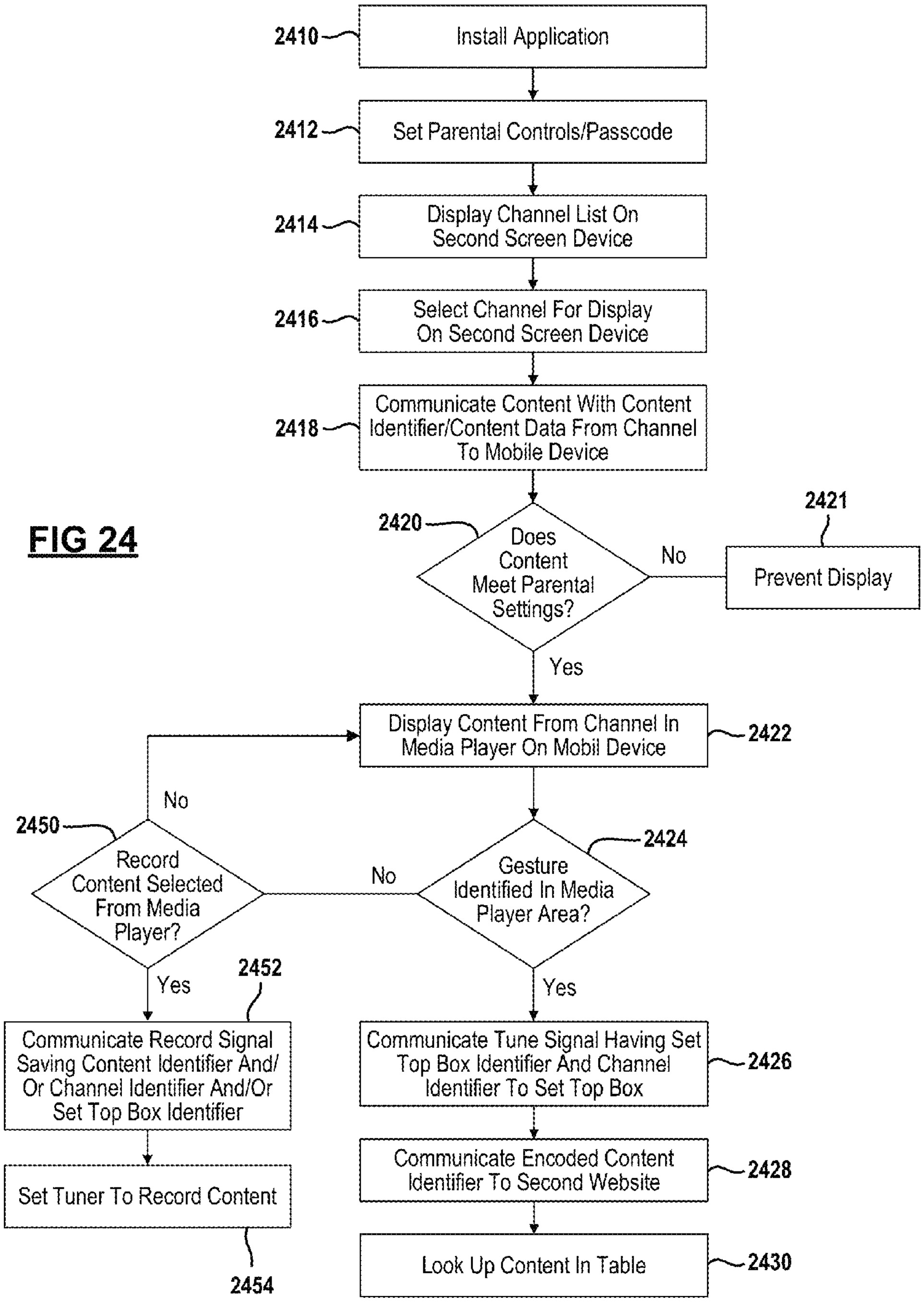
FIG. 24 is a flowchart of a method for tuning a set top box and recording content in a set top box as controlled from a second screen device.

Referring now to FIG. 24, a method for operating a second screen device with a set top box is set forth. In step 2410, an application for the second screen device is installed on the second screen device. Similarly, an application may be required to be installed on the set top box. This step may only be required to be performed once. In step 2412, an optional step of setting the parental controls within the set top box may be performed. As mentioned, various aspects of parental controls may be controlled depending upon the particular system requirements. For example, the movie rating, the television rating, the viewing time restrictions, and other specific parental ratings may be set. Examples are set forth above in FIGS. 9-17. A passcode may also be set in step 2412 to prevent unauthorized changes to the parental control settings.

In step 2414, a channel list suitable for streaming may be displayed on the second screen device. In step 2416, a channel may be selected for display on the second screen device. In step 2418, content is communicated with a content identifier or other content data to the second screen device. The content may be streamed using a channel stream corresponding to an over-the-air broadcast channel stream. The channel stream may, however, be formatted for various mobile devices in a different format such as an IP format.

In step 2420, the channel data associated with the content channel and the content or program displayed is compared to the parental settings. If the channel data does not meet the parental settings, step 2421 prevents the display of the channel. In step 2420, when the channel data is within the parental settings, the channel may be displayed. It should be noted that the channel content and thus the channel data may continually change. Therefore, the step of 2420 may be continually performed especially during program transition times within the channel. That is, at some point a different program may be displayed on the channel that has a different rating and thus the ratings may be continually monitored.

After the channel data (optionally) meets the parental settings, step 2422 displays content from the channel and the media player on the mobile device. Step 2422 may launch the media player as an overlay on the second screen device. Various controls may also be associated with the media player. For example, the media player may be sized or repositioned since it is an overlay. Various positions or the like may be performed with gestures on a touch screen in step 2424. When a gesture is identified for which tuning is desired, step 2426 is performed. The gesture from step 2424 may correspond to touching an area on the tough screen within the outer boundaries of the media player for a predetermined amount of time and then generating an upward motion on the touch screen. When a particular gesture is identified using mathematical algorithms, the controller of the set top box determines a tuning signal is required. The tuning signal is generated in step 2426. The tuning signal, as mentioned above, may include a content identifier or channel identifier which is sent to the set top box through the local area network. A set top box identifier may also be included within the tune signal. As mentioned above, both the second screen device and set top box may be required to be in the same network or the same router depending upon rights granted from the content suppliers. In other situations, there may be no requirement between or for the same local area network.

In step 2428, the set top box may be tuned in response to the tune signal. That is, the controller may generate a tuner control signal that tunes the tuner to a broadcasted channel being received at the set top box. Typically, the channel signal may be received through a cable or from a satellite. Once tuned, the set top box generates an output signal corresponding to the channel in the tune signal.

In step 2430, a tuning confirmation indicator may be generated at the second screen device. That is, the indicator as set forth above may be displayed on the screen of the second screen device indicating that the tuning signal was sent to the set top box. The name of the particular set top box may be set forth.

Referring back to step 2424, when the gesture identified corresponds to a recording area or a recording selection, step 2450 may be performed. In step 2450, recording content may be desired from the second screen device. If the gesture does not correspond to a recording selection, step 2422 may again be performed. The current example is only provided with two selections or gestures. Of course, other gestures may be used to perform different functions.

In step 2450 when recording content is selected from the media player displayed on the media player of the second screen device, step 2452 communicates a record command signal having a content identifier and/or a channel identifier to the set top box. The recording signal also may include a set top box identifier since more than one set top box may be in a household.

Step 2454 tunes a tuner to record the content on the content channel and stores the content within the set top box according to the record signal.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:

displaying streamed content with a channel identifier of a selected channel on a screen device, wherein the screen device has a touch screen, and wherein the streamed content has a content identifier;

recognizing a first gesture performed within outer boundaries of a media player window while the screen device is displaying the streamed content of the selected channel in the media player window when the first gesture is performed for a predetermined amount of time followed by a second gesture in a particular direction, wherein the media player window is displayed on the touch screen;

forming a tune command comprising the channel identifier, content identifier, and a receiving device identifier comprising an Internet-Protocol (IP) address of the receiving device in response to the first gesture followed by the second gesture;

communicating the tune command to a receiving device from the screen device;

tuning the receiving device to receive a channel signal corresponding to the streamed content in response to the tune command;

comparing content data to parental controls associated with the screen device; and displaying the channel signal on a display of the receiving device when the parental controls correspond to the content data.

2. The method as recited in claim 1 further comprising generating a gesture indicator on the touch screen in response to the first gesture.

3. The method as recited in claim 1 further comprising generating a gesture indicator on the touch screen in response to the first gesture performed for at least the predetermined amount of time.

4. The method as recited in claim 1 wherein the forming the tune command comprises forming the tune command to include the identifier associated with the streamed content and an address of a set top box.

5. The method as recited in claim 1 wherein the forming of the tune command comprises forming the tune command to include a channel identifier and an address of a satellite television set top box.

6. The method as recited in claim 1 wherein the communicating of the tune command comprises communicating the tune command from the screen device to the receiving device through a local area network.

7. The method as recited in claim 1 wherein the communicating of the tune command comprises communicating the tune command to the receiving device through a local area network and a router.

8. The method as recited in claim 1 wherein the parental controls comprise at least one of a rating, a channel identifier and a time restriction.

9. A system comprising:

a receiving device; and a screen device in communication with the receiving device and having a touch screen, wherein the screen device displays video images of streamed content and a channel identifier for a selected channel in a media player window having outer boundaries on the touch screen, said streamed content having a content identifier, wherein said screen device recognizes a first gesture in the media player window within the outer boundaries while the screen device is displaying the streamed content of the selected channel in the media player window, said first gesture being performed for a predetermined amount of time followed by a second gesture in a particular direction, wherein the screen device forms a tune command comprising the content identifier, the channel identifier and a receiving device identifier comprising an Internet-Protocol (IP) address of the receiving device in response to the first gesture followed by the second gesture, and communicates the tune command to the receiving device from the screen device to tune the receiving device to the selected channel;

wherein said receiving device is configured to compare content data to parental controls associated with the screen device, tune to the selected channel in response to the tune command, and to display the streamed content of the channel when the parental controls correspond to the content data.

10. The system as recited in claim 9 wherein:

the receiving device comprises a set top box;

the screen device comprises a mobile touch screen device; and the screen device communicates the tune command through a local area network.

11. The system as recited in claim 9 wherein the screen device displays a gesture indictor on the touch screen in response to the first gesture.

12. The system as recited in claim 9 wherein the screen device displays a gesture indictor on the touch screen in response to the first gesture performed for at least the predetermined amount of time.

13. The system as recited in claim 9 wherein the first gesture is formed using a tune selection box of the media player.

* * * * *